US009565572B2

(12) United States Patent
Seo et al.

(10) Patent No.: US 9,565,572 B2
(45) Date of Patent: Feb. 7, 2017

(54) METHOD FOR OPERATING SERVING CELL IN WIRELESS COMMUNICATION SYSTEM TO WHICH CARRIER AGGREGATION SCHEME IS APPLIED AND DEVICE FOR SAME

(71) Applicant: LG ELECTRONICS INC., Seoul (KR)

(72) Inventors: Hanbyul Seo, Anyang-si (KR); Sunghoon Jung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

(21) Appl. No.: 14/415,492

(22) PCT Filed: Jul. 12, 2013

(86) PCT No.: PCT/KR2013/006263
§ 371 (c)(1),
(2) Date: Jan. 16, 2015

(87) PCT Pub. No.: WO2014/017767
PCT Pub. Date: Jan. 30, 2014

(65) Prior Publication Data
US 2015/0189516 A1    Jul. 2, 2015

Related U.S. Application Data

(60) Provisional application No. 61/674,804, filed on Jul. 23, 2012, provisional application No. 61/750,323, filed on Jan. 8, 2013.

(51) Int. Cl.
*H04W 4/00*       (2009.01)
*H04L 1/00*       (2006.01)
(Continued)

(52) U.S. Cl.
CPC .............. *H04W 16/24* (2013.01); *H04L 5/001* (2013.01); *H04L 5/0091* (2013.01); *H04W 16/02* (2013.01);
(Continued)

(58) Field of Classification Search
CPC .. H04W 16/24; H04W 74/0833; H04W 48/10; H04W 16/02; H04W 36/0005; H04L 5/0091; H04L 5/001; H04B 7/0689; H04B 7/0413; H04B 7/024
See application file for complete search history.

(56) References Cited

U.S. PATENT DOCUMENTS

2010/0222059 A1    9/2010  Pani et al.
2011/0134774 A1    6/2011  Pelletier et al.
(Continued)

FOREIGN PATENT DOCUMENTS

KR    10-2011-0030596 A    3/2011
KR    10-2011-0036518 A    4/2011

OTHER PUBLICATIONS

3GPP TS 36.300 V10.2.0, "3rd GPP; Technical Specification Group Radio Access Network; Evolved Universal Terrestrial Radio Access (E-UTRA) and Evolved Universal Terrestrial Radio Access Network (E-UTRAN); Overall description Stage 2 (Release 10)", Dec. 2010, pp. 1-201.

*Primary Examiner* — Kiet Tang
(74) *Attorney, Agent, or Firm* — Birch, Stewart, Kolasch & Birch, LLP

(57) ABSTRACT

A method for operating a serving cell by a user equipment (UE) in a wireless communication system is disclosed. Specifically, the method comprises the steps of: forming a plurality of secondary cells (SCells), as one group, corresponding to a same frequency band through an upper layer; setting an enabled first SCell among the plurality of SCells as the serving cell and transmitting and receiving signals
(Continued)

with a network; receiving a serving cell configuration message from the network to disable the first Scell and enable a second SCell; and setting the enabled second SCell as the serving cell and transmitting and receiving signals with the network.

14 Claims, 19 Drawing Sheets

(51) Int. Cl.
| | |
|---|---|
| *H04W 16/24* | (2009.01) |
| *H04L 5/00* | (2006.01) |
| *H04W 36/00* | (2009.01) |
| *H04W 16/02* | (2009.01) |
| *H04W 48/10* | (2009.01) |
| *H04W 74/08* | (2009.01) |
| *H04B 7/02* | (2006.01) |
| *H04B 7/04* | (2006.01) |
| *H04B 7/06* | (2006.01) |

(52) U.S. Cl.
CPC ......... *H04W 36/0005* (2013.01); *H04W 48/10* (2013.01); *H04W 74/0833* (2013.01); *H04B 7/024* (2013.01); *H04B 7/0413* (2013.01); *H04B 7/0689* (2013.01)

(56) References Cited

U.S. PATENT DOCUMENTS

2012/0087257 A1* 4/2012 Larsson .................. H04L 5/001
370/252
2012/0176926 A1* 7/2012 Jang ...................... H04W 24/02
370/252
2012/0314635 A1 12/2012 Lee et al.

* cited by examiner

FIG. 2
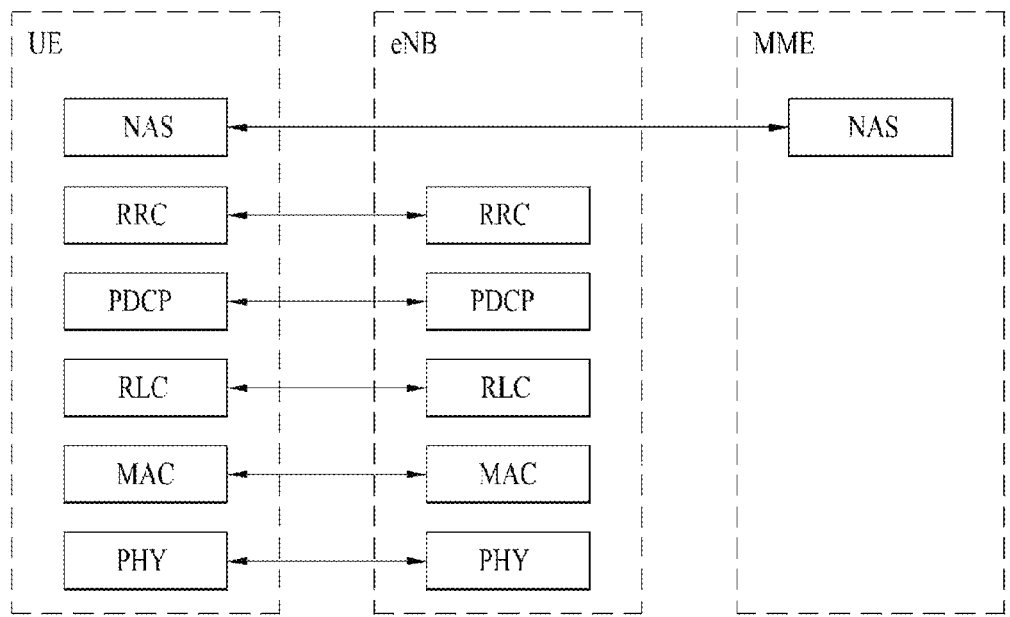
(a) CONTROL-PLANE PROTOCOL STACK
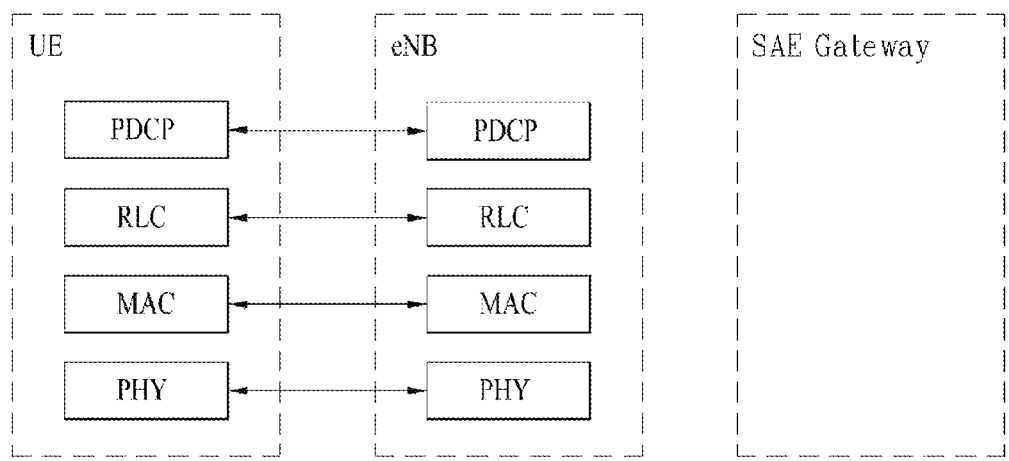
(b) USER-PLANE PROTOCOL STACK FIG. 19
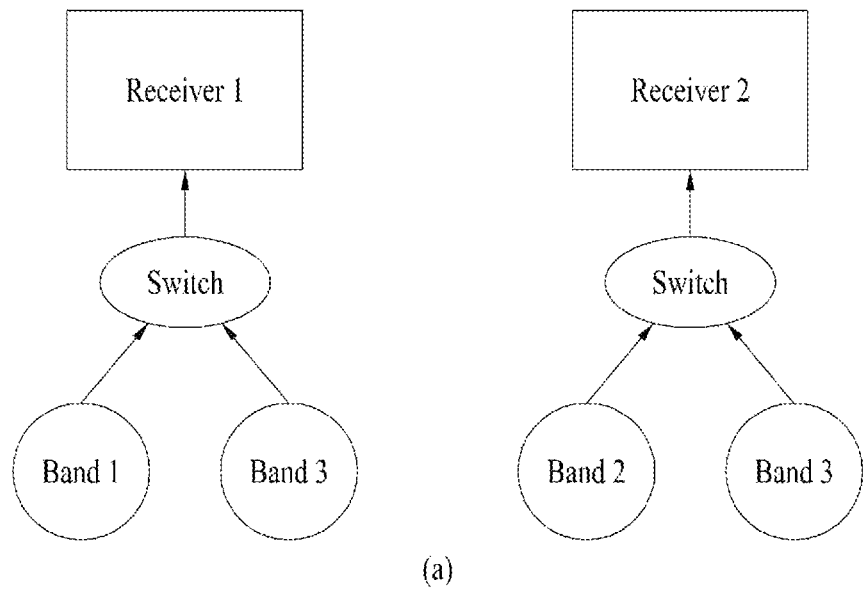
(a)
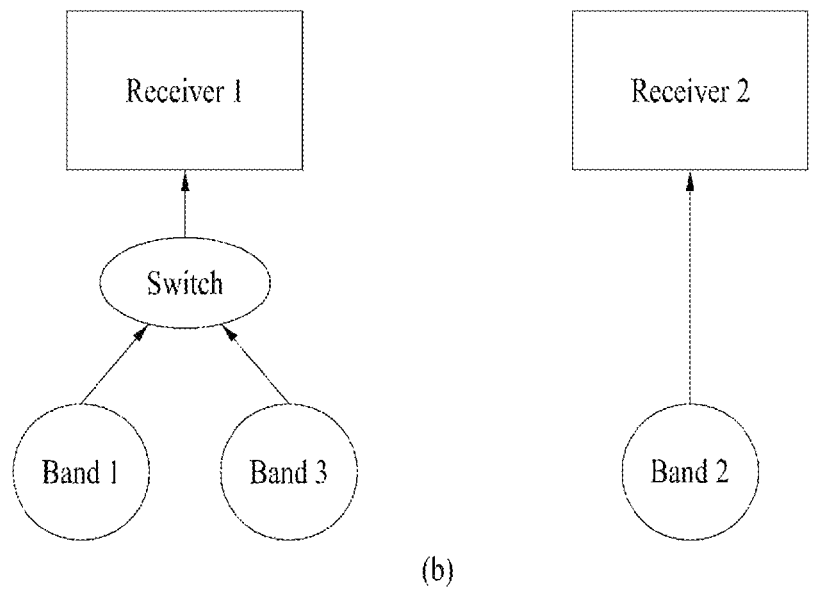
(b)

METHOD FOR OPERATING SERVING CELL IN WIRELESS COMMUNICATION SYSTEM TO WHICH CARRIER AGGREGATION SCHEME IS APPLIED AND DEVICE FOR SAME

CROSS REFERENCE TO RELATED APPLICATIONS

This application is the National Phase of PCT/KR2013/006263 filed on Jul. 12, 2013, which claims priority under 35 U.S.C. 119(e) to U.S. Provisional Application Nos. 61/674,804 filed on Jul. 23, 2012, and 61/750,323 filed on Jan. 8, 2013, all of which are hereby expressly incorporated by reference into the present application.

TECHNICAL FIELD

The present invention relates to a wireless communication system and, more particularly, to a method and apparatus for operating a serving cell in a wireless communication system, to which a carrier aggregation scheme is applied.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention devised to solve the problem lies in a method and apparatus for operating a serving cell in a wireless communication system, to which a carrier aggregation scheme is applied.

Technical Solution

The object of the present invention can be achieved by providing a method for operating a serving cell at a user equipment (UE) in a wireless communication system including configuring a plurality of secondary cells (SCells) corresponding to the same frequency band as one group via a higher layer, configuring an activated first SCell among the plurality of SCells as the serving, cell to transmit and receive a signal to and from a network, receiving a serving cell configuration message from the network to deactivate the first SCell and activate a second SCell, and configuring the activated second SCell as the serving cell to transmit and receive the signal to and from the network.

The method may further include configuring one primary cell (PCell), which is always activated, as the serving cell to transmit and receive the signal to and from the network.

In another aspect of the present invention, provided herein is a user equipment (UE) apparatus in a wireless communication system including a wireless communication module configured to transmit and receive a signal to and from a network and a processor configured to process the signal, wherein the processor controls the wireless communication module to configure a plurality of secondary cells (SCells) corresponding to the same frequency band as one group via a higher layer, to configure an activated first SCell among the plurality of SCells as the serving cell to transmit and receive a signal to and from the network, to deactivate the first SCell and activate a second SCell upon receiving a serving cell configuration message from the network and to configure the activated second SCell as the serving cell to transmit and receive the signal to and from the network.

The processor may control the wireless communication module to configure one primary cell (PCell), which is always activated, as the serving cell to transmit and receive the signal to and from the network.

In the above-described embodiment, a frequency band corresponding to the plurality of SCells may be higher than a frequency band of the PCell. Coverage of the plurality of SCells may be included in coverage of the PCell.

The serving cell configuration message may be included in a medium access control (MAC) control element (CE).

The plurality of SCells configuring the group may be identified by different carrier indicator field values, and the serving cell configuration message my include information about one of the different carrier indicator field values.

Alternatively, the plurality of SCells configuring the group may be identified by the same cell identifier and the same carrier indicator field value, and the serving cell configuration message may include configuration information of a signal transmitted and received to and from the second SCell. The configuration information of signals transmitted and received to and from the plurality of SCells may be different.

Advantageous Effects

According to embodiments of the present invention, it is possible to efficiently operate a serving cell in a wireless communication system, to which a carrier aggregation scheme is applied.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 shows a control plane and a user plane of a radio interface protocol between a UE and an evolved universal terrestrial radio access network (E-UTRAN) based on a 3GPP radio access network standard.

FIG. 19 is a diagram showing the structure of a receiver of a user equipment (UE) supporting carrier aggregation according to one embodiment.

BEST MODE

Figure 1:
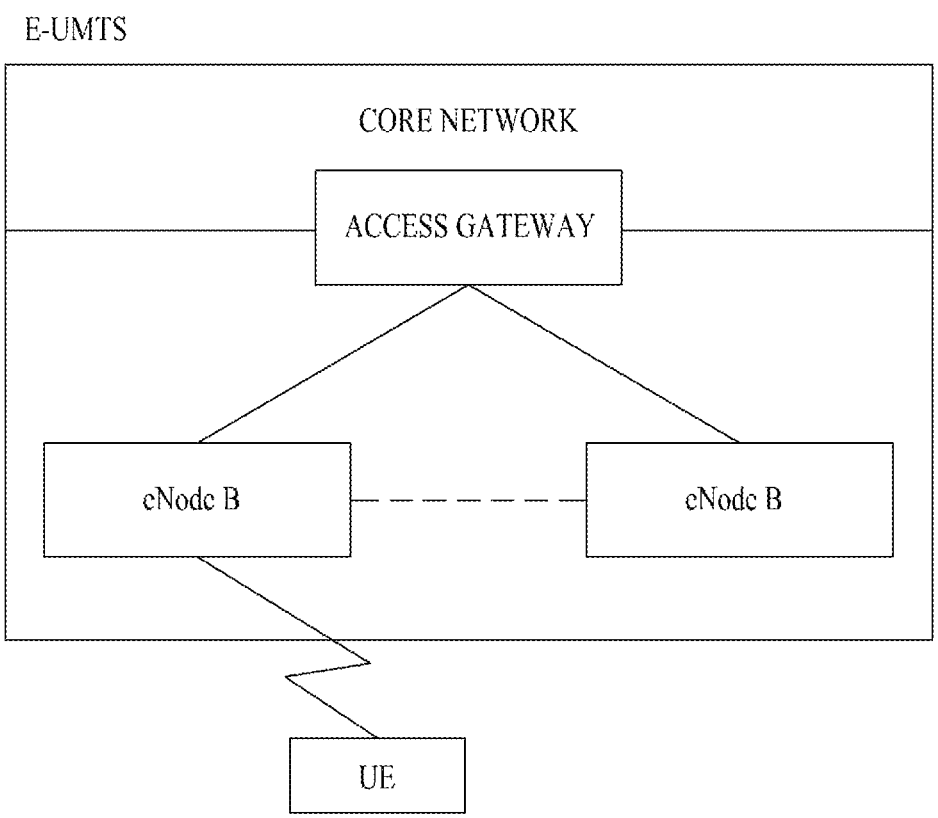
FIG. 1 is a diagram showing a network structure of an evolved universal mobile telecommunications system (E-UMTS) as a mobile communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

And, in the present specification, a base station can be named by such a comprehensive terminology as an RRH (remote radio head), an eNB, a TP (transmission point), an RP (reception point), a relay and the like.

FIG. 2 shows a control plane and a user plane of a radio interface protocol between a UE and an evolved universal terrestrial radio access network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an orthogonal frequency division multiple access (OFDMA) scheme in downlink and is modulated using a single-carrier frequency division multiple access (SC-FDMA) scheme in uplink.

A medium access control (MAC) layer of a second layer provides a service to a radio link control (RLC) layer of a higher layer via a logical channel. The RLC layer of the second layer supports reliable data transmission. The function of the RLC layer may be implemented by a functional block within the MAC. A packet data convergence protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A radio resource control (RRC) layer located at the bottom of a third layer is defined only in the control plane and is responsible for control of logical, transport, and physical channels in association with configuration, re-configuration, and release of radio bearers (RBs). The RB is a service that the second layer provides for data communication between the UE and the network. To accomplish this, the RRC layer of the UE and the RRC layer of the network exchange RRC messages. If an RRC connection is established between the UE and the E-UTRAN, the UE is in RRC Connected mode and otherwise, the UE is in RRC idle mode. A non-access stratum (NAS) layer above the RRC layer performs functions including session management and mobility management.

One cell of the eNB is set to use a bandwidth such as 1.25, 2.5, 5, 10, 15, or 20 MHz to provide a downlink or uplink transmission service to several UEs. Different cells may be set to provide different bandwidths.

Downlink transport channels for transmission of data from the network to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a random access channel (RACH) for transmission of initial control messages and an uplink SCH for transmission of user traffic or control messages. Logical channels, which are located above the transport channels and are mapped to the transport channels, include a broadcast control channel (BCCH), a paging control channel (PCCH), a common control channel (CCCH), a multicast control channel (MCCH), and a multicast traffic channel (MTCH).

Figure 3:
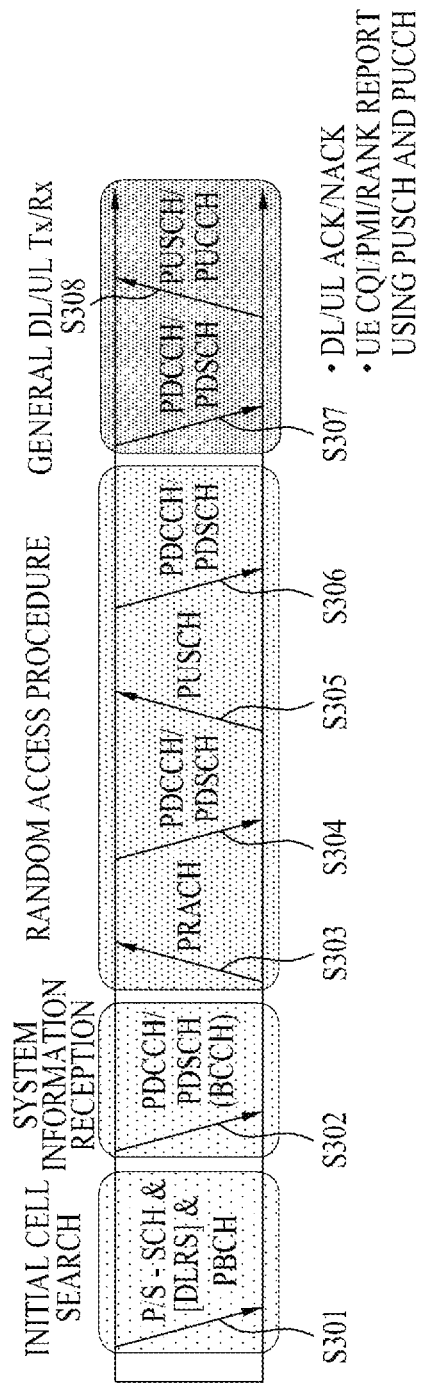
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a primary synchronization channel (P-SCH) and a secondary synchronization channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a downlink reference signal (DL RS) so as to confirm a downlink channel state in the initial cell search step.

The UE which completes the initial cell search may receive a physical downlink control channel (PDCCH) and a physical downlink shared channel (PDSCH) according to information included in the PDCCH so as to acquire more detailed system information (S302).

Meanwhile, if the eNB is initially accessed or radio resources for signal transmission are not present, the UE may perform a random access procedure (RACH) (step S303 to S306) with respect to the eNB. In this case, the UE may transmit a specific sequence through a physical random access channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and physical uplink shared channel (PUSCH)/physical uplink control channel (PUCCH) transmission (S308) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 4:
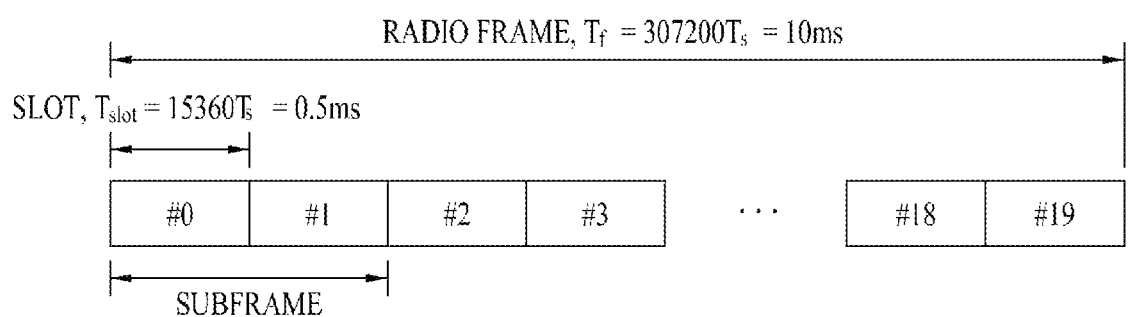
FIG. 4 illustrates an exemplary control channel included in the control region of a subframe in a radio frame.

FIG. 4 is a diagram showing the structure of a radio frame used in a Long Term Evolution (LTE) system.

Referring to FIG. 4, the radio frame has a length of 10 ms ($327200 \times T_s$) and includes 10 subframes with the same size. Each of the subframes has a length of 1 ms and includes two slots. Each of the slots has a length of 0.5 ms ($15360 \times T_s$). $T_s$ denotes a sampling time, and is represented by $T_s = 1/(15 \text{ kHz} \times 2048) = 3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A transmission time interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Figure 5:
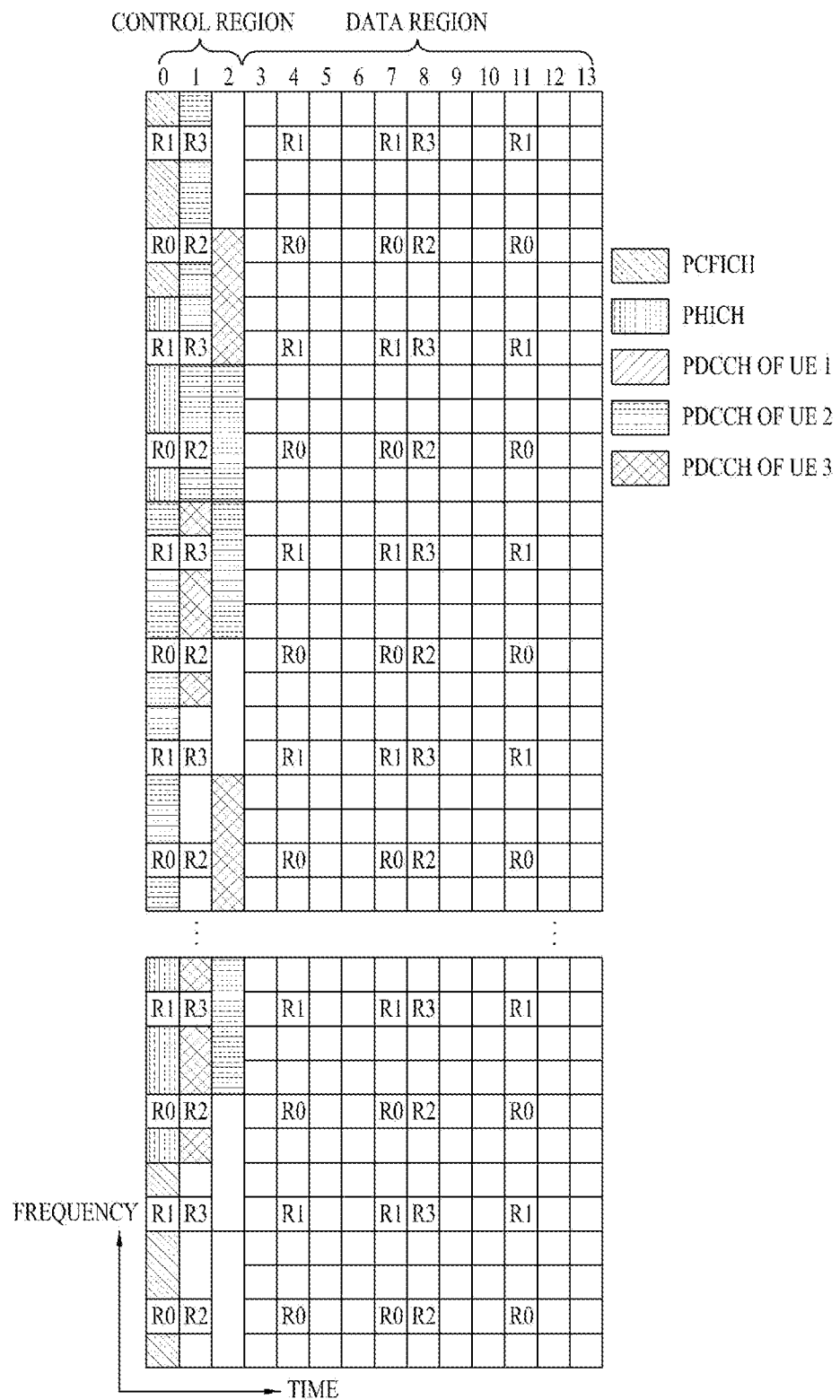
FIG. 5 illustrates a structure of a downlink (DL) subframe in an LTE system.

FIG. 5 illustrates an exemplary control channel included in the control region of a subframe in a downlink radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a physical control format indicator channel (PCFICH), a physical hybrid-arq indicator channel (PHICH), a physical downlink control channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH is composed of 4 resource element groups (REGs), each REG being distributed to the control region based on a cell identity (ID). One REG includes 4 resource elements (REs). An RE is a minimum physical resource defined by one subcarrier by one OFDM symbol. The PCFICH indicates 1 to 3 or 2 to 4 according to a bandwidth. The PCFICH is modulated in quadrature phase shift keying (QPSK).

The PHICH is a physical hybrid-automatic repeat and request (HARQ) indicator channel carrying an HARQ ACK/NACK for an uplink transmission. That is, the PHICH is a channel that delivers DL ACK/NACK information for UL HARQ. The PHICH includes one REG and is scrambled cell-specifically. An ACK/NACK is indicated in one bit and modulated in binary phase shift keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical downlink control channel allocated to the first n OFDM symbols of a subframe. Here, n is 1 or a larger integer indicated by the PCFICH. The PDCCH is composed of one or more CCEs. The PDCCH carries resource allocation information about transport channels, PCH and DL-SCH, an uplink scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the cyclic redundancy check (CRC) of a specific PDCCH is masked by radio network temporary identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
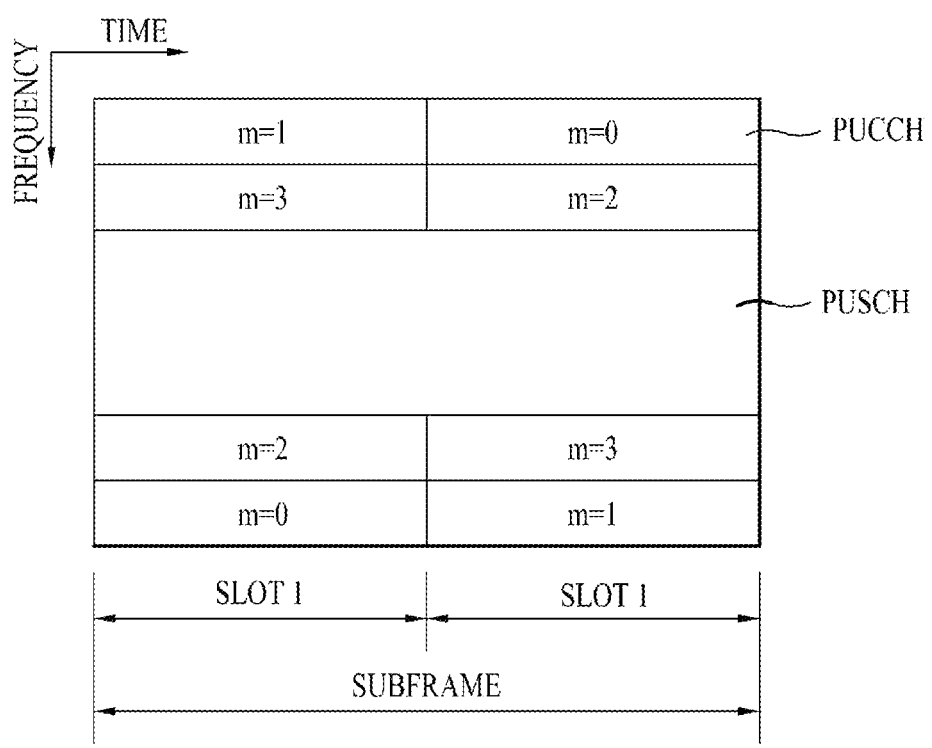
FIG. 6 illustrates a structure of an uplink (UL) subframe in an LTE system.

FIG. 6 illustrates a structure of a UL subframe in the LTE system.

Referring to FIG. 6, a UL subframe may be divided into a control region and a data region. A physical uplink control channel (PUCCH) including uplink control information (UCI) is allocated to the control region and a physical uplink shared channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for multiple input multiple output (MIMO), a scheduling request (SR) requesting UL resource allocation. A PUCCH for one UE occupies one resource block (RB) having a different frequency in each slot of a subframe. That is, the two RBs allocated to the PUCCH frequency-hop over the slot boundary of the subframe. Particularly, PUCCHs with m=0, m=1, m=2, and m=3 are allocated to a subframe in FIG. 6.

Figure 7:
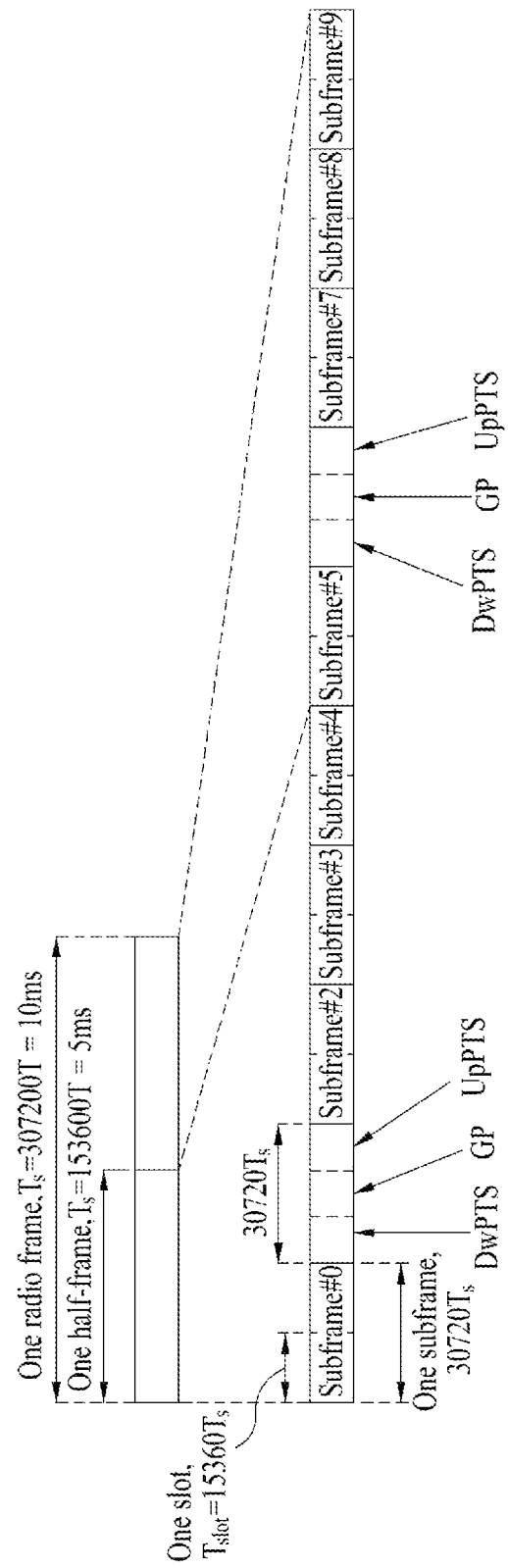
FIG. 7 illustrates a structure of a radio frame in an LTE TDD system.

FIG. 7 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Special subframe configuration is defined in the current 3GPP standard document as shown in [Table 2] below. In [Table 2], $T_s=1/(15000\times2048)$ refers to a DwPTS and a UpPTS and the remaining region is configured as a GP.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Meanwhile, in an LTE TDD system, a UL/DL configuration is shown in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 2-continued

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D indicates a downlink subframe, U indicates an uplink subframe, and S means the special subframe. Also, the above Table 2 represents a downlink-uplink switching period of uplink/downlink subframe configuration in each system.

Table 3 below shows an uplink subframe number (index) for transmitting uplink ACK/NACK for a downlink signal at a UE in a TDD system based on a 3GPP LTE system.

TABLE 3

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | 4 | 7 | — | — | — | 9 | 2 | — | — | — |
| 1 | 7 | 7 | — | — | 8 | 2 | 2 | — | — | 3 |
| 2 | 7 | 7 | — | 7 | 2 | 2 | 2 | — | 2 | 7 |
| 3 | 4 | 2 | — | — | — | 2 | 2 | 3 | 3 | 4 |
| 4 | 2 | 2 | — | — | 2 | 2 | 3 | 3 | 3 | 3 |
| 5 | 2 | 2 | — | 2 | 2 | 2 | 2 | 2 | 2 | 2 |
| 6 | 7 | 8 | — | — | — | 2 | 3 | — | — | 4 |

In particular, "-" indicates that an uplink subframe is configured and a numeral assigned to each subframe number indicates an uplink subframe index, that is, an uplink subframe index linked to the downlink subframe.

Hereinafter, a carrier aggregation scheme will be described.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' will consistently used.

A system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. The component carriers may have different bandwidths. In addition, the component carriers may be physically adjacent to each other or may be spaced apart from each other.

Component carriers can use different center frequencies or use one common center frequency with respect to physically adjacent component carriers. For example, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

An LTE system may use one downlink component carrier and one uplink component carrier, whereas an LTE-A system may use a plurality of component carriers. In this case, a method for scheduling a data channel by a control channel may be classified into a linked carrier scheduling method and a cross carrier scheduling method.

In more detail, in the linked carrier scheduling method, a control channel transmitted through a specific component carrier schedules only a data channel through the specific component carrier like in a legacy LTE system using a single component carrier.

Meanwhile, in the cross carrier scheduling method, a control channel transmitted through a primary component carrier (primary CC) using a carrier indicator field (CIF) schedules a data channel transmitted through a data channel transmitted through the primary CC, that is, a secondary CC.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 8:
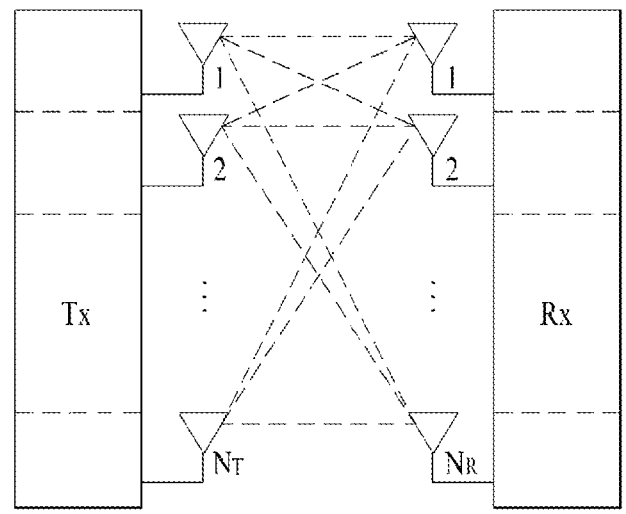
FIG. 8 is a block diagram of a general multi-antenna (MIMO) communication system.

A block diagram of a general multi-antenna (MIMO) communication system is depicted in FIG. 8.

$N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Equation 1. In this case, the $R_i$ is a smaller value of the $N_T$ and the $N_R$.

$$R_i = \min(N_T, N_R) \quad \text{[Equation 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a 3rd generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 8, assume that there exist NT number of transmitting antenna and NR number of receiving antenna. First of all, if we look into a transmission signal, since the maximum number of information capable of being transmitted is NT in case that there exists NT number of transmitting antenna, transmission information can be represented as a vector in the following Equation 2.

$$s = [s_1, s_2, \ldots, s_{N_T}] \quad \text{[Equation 2]}$$

Meanwhile, for each of the transmission informations $s_1, s_2, \ldots, s_{N_T}$, a transmit power may be differentiated according to the each of the transmission informations. In this case, if each of the transmit powers is represented as $P_1, P_2, \ldots, P_{N_T}$, transmit power-adjusted transmission information can be represented as a vector in the following Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

And, if $\hat{s}$ is represented using a diagonal matrix P, it can be represented as a following Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, let's consider a case that the NT number of transmission signal $x_1, x_2, \ldots, x_{N_T}$, which is practically transmitted, is configured in a manner of applying a weighted matrix W to the adjusted information vector $\hat{S}$. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Equation 5. In this case, $W_{ij}$ means a weighting between an ith transmitting antenna and jth information. The W is called the weighted matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Equation 6.

$$\text{rank}(H) \leq \min(N_T, N_R) \quad \text{[Equation 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Equation 7 in the following.

$$\# \text{ of streams} \leq \text{rank}(H) \leq \min(N_T, N_R) \quad \text{[Equation 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

Meanwhile, it is expected that a LTE-A system, which is a standard of a next generation mobile communication system, will support a CoMP (coordinated multi point) transmission method, which is not supported by the conventional standard, to enhance a data transmission rate. In this case, the CoMP transmission method is a transmission method for two or more base stations or cells to communicate with the user equipment in a manner of cooperating with each other to enhance a communication performance between the user equipment situated at a radio shadow zone and the base station (a cell or a sector).

The CoMP transmission method can be classified into a join processing (CoMP-joint processing, CoMP-JP) method in the form of a cooperative MIMO via data sharing and a coordinated scheduling/beamforming (CoMP-coordinated scheduling/beamforming, CoMP-CS/CB) method.

According to the joint processing (CoMP-JP) method in DL, a user equipment may be able to instantaneously receive data simultaneously from each of the base stations performing the CoMP transmission method. And, a reception performance can be enhanced in a manner of combining the signals received from each of the base stations (Joint Transmission (JT)). And, it is also possible to consider a method of transmitting a data to the user equipment on a specific timing by one of the base stations performing the CoMP transmission method (Dynamic Point Selection (DPS)). On the other hand, according to the coordinated scheduling/beamforming method (CoMP-CS/CB), the user equipment may be able to instantaneously receive data from a single base station via a beamforming.

According to the joint processing (CoMP-JP) method in UL, each of the base stations may be able to simultaneously receive PUSCH signal from the user equipment (Joint Reception (JR)). On the other hand, according to the coordinated scheduling/beamforming method (CoMP-CS/CB), only a single base station may be able to receive the PUSCH. In this case, the decision to use the coordinated scheduling/beamforming method is determined by the coordinating cells (or base stations).

In a current wireless communication environment, with emergence and dissemination of various devices requiring high data transfer rate, data requirements of a cellular network are growing very quickly. To satisfy high data requirements, carrier aggregation technology for efficiently using a larger frequency band, multi antenna technology for increasing data capacity within a restricted frequency, multi base-station coordinated technology, etc. have been developed as communication technology and a communication environment is evolved to increase the density of nodes which can be accessed by users.

Coordination between nodes may improve system performance of a system with a high density of nodes. In such a system, each node operates exhibits far superior performance to a non-coordinated system.

Figure 9:
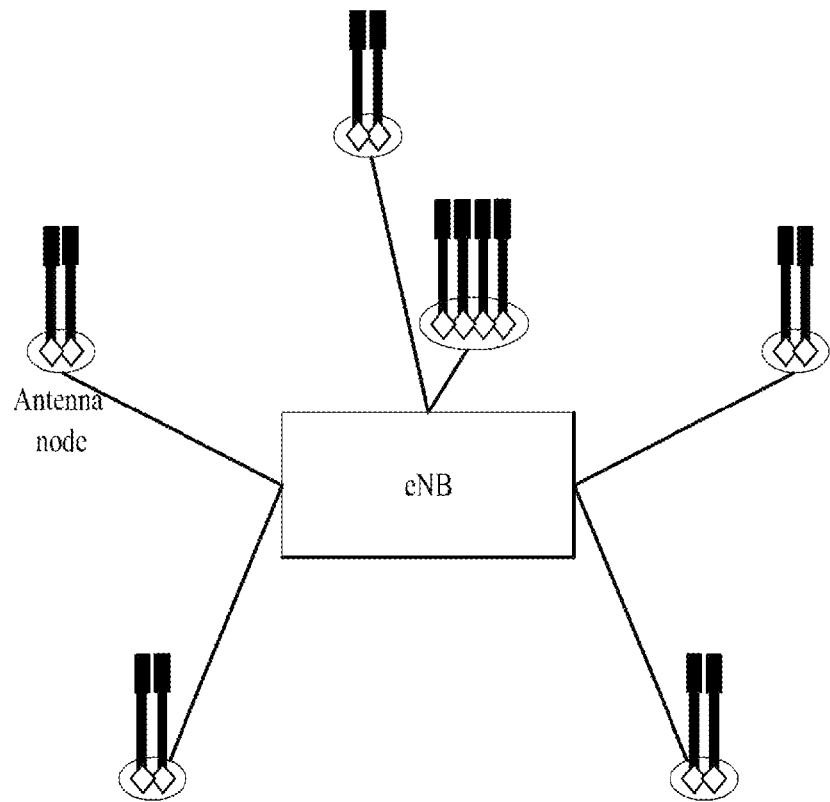
FIG. 9 is a diagram showing a multi-node system in a next-generation communication system.

FIG. 9 is a diagram showing a multi-node system in a next-generation communication system.

Referring to FIG. 9, if transmission and reception of all nodes are managed by one controller such that the individual nodes operate as parts of an antenna group of one cell, this system may be regarded as a distributed multi node system (DMNS) forming one cell. At this time, the individual nodes may be assigned separate node IDs or may operate as some antennas of a cell without a separate node ID. However, a system including nodes having different cell identifiers (IDs) may be a multi cell system. If multiple cells are configured to overlap according to coverage, this is called a multi-tier network.

A NodeB, an eNodeB, a PeNB, a HeNB, a remote radio head (RRH), a relay, a distributed antenna, etc. may become a node and at least one antenna is mounted per node. The node is also called a transmission point. Although the node generally refers to a group of antennas separated by a predetermined distance or more, the present invention is applicable to an arbitrary group of nodes defined regardless of spacing.

Due to introduction of the above-described multi node system and relay node, various communication schemes are applicable to improve channel quality. However, in order to apply the MIMO scheme and an inter-cell communication scheme to a multi node environment, a new control channel is required. Accordingly, an enhanced-physical downlink control channel (EPDCCH) is being discussed as a newly introduced control channel and is allocated to a data region (hereinafter, referred to as a PDSCH region), not to an existing control region (hereinafter, referred to as a PDCCH region). In conclusion, control information of a node can be transmitted to each UE via such an EPDCCH so as to solve a problem that an existing PDCCH region is insufficient. For reference, the EPDCCH may not be transmitted to a legacy UE but may only be transmitted to an LTE-A UE.

Figure 10:
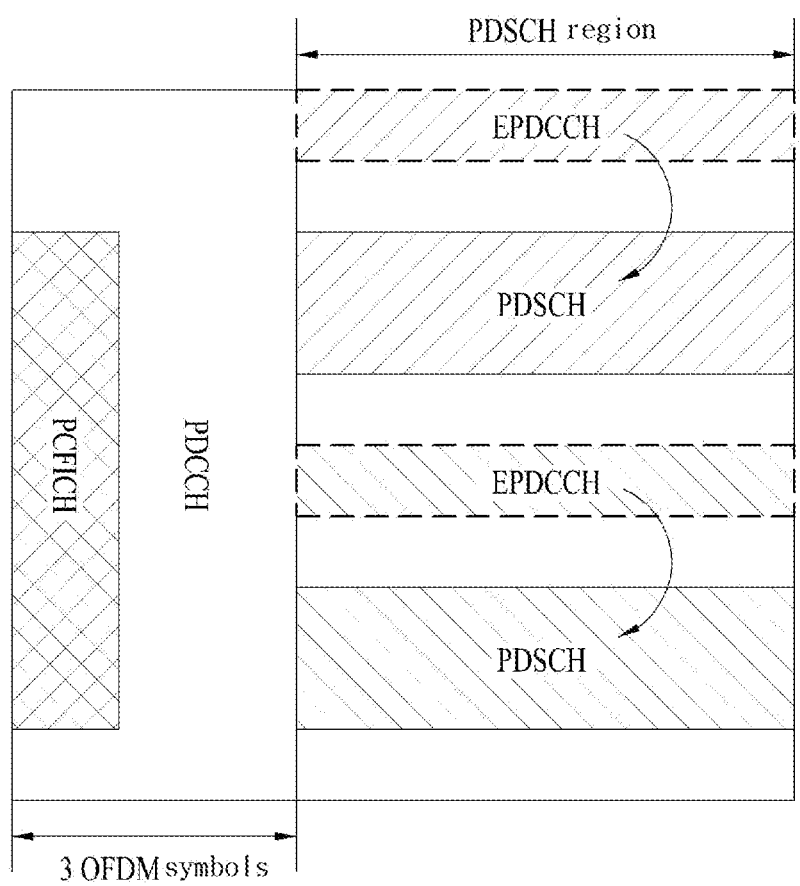
FIG. 10 is a diagram showing an EPDCCH and a PDSCH scheduled by the EPDCCH.

FIG. 10 is a diagram showing an EPDCCH and a PDSCH scheduled by the EPDCCH.

Referring to FIG. 10, E-PDCCH can be used in a manner of defining a part of PDSCH region, which is generally transmitting data. A UE should perform a blind decoding process to detect presence or non-presence of the E-PDCCH in the UE.

In the following description, an example for a transmission mode of a downlink data channel is described.

Currently, 3GPP LTE standard document, specifically, 3GPP TS 36. 213 document defines a transmission mode of a downlink data channel as shown in Table 4 and Table 5 in the following. The transmission mode is set to a user equipment via an upper layer signaling, i.e., RRC signaling.

TABLE 4

| Transmission mode | DCI format | Transmission scheme of PDSCH corresponding to PDCCH |
|---|---|---|
| Mode 1 | DCI format 1A | Single-antenna port, port 0 |
| | DCI format 1 | Single-antenna port, port 0 |
| Mode 2 | DCI format 1A | Transmit diversity |
| | DCI format 1 | Transmit diversity |
| Mode 3 | DCI format 1A | Transmit diversity |
| | DCI format 2A | Large delay CDD or Transmit diversity |
| Mode 4 | DCI format 1A | Transmit diversity |
| | DCI format 2 | Closed-loop spatial multiplexing or Transmit diversity |
| Mode 5 | DCI format 1A | Transmit diversity |
| | DCI format 1D | Multi-user MIMO |
| Mode 6 | DCI format 1A | Transmit diversity |
| | DCI format 1B | Closed-loop spatial multiplexing using a transmission layer |
| Mode 7 | DCI format 1A | If the number of PBCH antenna ports is one, Single-antenna port, port 0 is used, otherwise Transmit diversity |
| | DCI format 1 | Single-antenna port, port 5 |
| Mode 8 | DCI format 1A | If the number of PBCH antenna ports is one, Single-antenna port, port 0 is used, otherwise Transmit diversity |
| | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity MBSFN subframe: Single-antenna port, port 7 |
| | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity MBSFN subframe: Single-antenna port, port 7 |
| | DCI format 2D | Up to 8 layer transmission, ports 7-14 or single-antenna port, port 7 or 8 |

TABLE 5

| Transmission mode | DCI format | Transmission scheme of PDSCH corresponding to PDCCH |
|---|---|---|
| Mode 1 | DCI format 1A | Single-antenna port, port 0 |
| | DCI format 1 | Single-antenna port, port 0 |
| Mode 2 | DCI format 1A | Transmit diversity |
| | DCI format 1 | Transmit diversity |
| Mode 3 | DCI format 1A | Transmit diversity |
| | DCI format 2A | Transmit diversity |
| Mode 4 | DCI format 1A | Transmit diversity |
| | DCI format 2 | Transmit diversity |
| Mode 5 | DCI format 1A | Transmit diversity |
| Mode 6 | DCI format 1A | Transmit diversity |
| Mode 7 | DCI format 1A | Single-antenna port, port 5 |
| | DCI format 1 | Single-antenna port, port 5 |
| Mode 8 | DCI format 1A | Single-antenna port, port 7 |
| | DCI format 2B | Single-antenna port, port 7 or 8 |
| Mode 9 | DCI format 1A | Single-antenna port, port 7 |
| | DCI format 2C | Single-antenna port, port 7 or 8, |
| Mode 10 | DCI format 1A | Single-antenna port, port 7 |
| | DCI format 2D | Single-antenna port, port 7 or 8, |

Referring to Table 4 and Table 5, current 3GPP LTE standard document includes a downlink control information (DCI) format, which is defined according to a type of RNTI masked on PDCCH. In particular, in case of a C-RNTI and an SPS C-RNTI, a transmission mode and a DCI format corresponding to the transmission mode (i.e., a transmission mode-based DCI format) are included in the document. And, a DCI format 1A for a Fall-back mode, which is capable of being applied irrespective of each transmission mode, is defined in the document. Table 4 shows an example of a case that a type of RNTI masked on PDCCH corresponds to a C-RNTI and Table 5 shows an example of a case that the type of RNTI masked on PDCCH corresponds to an SPS C-RNTI.

As an example of an operation of a transmission mode, referring to Table 4, if a user equipment performs a blind decoding on PDCCH masked with C-RNTI and then detects a DCI format 1B, the user equipment decodes PDSCH in an assumption that the PDSCH has been transmitted with a closed-loop spatial multiplexing scheme using a single transmission layer.

In Table 4 and Table 5, a transmission mode 10 indicates a downlink data channel transmission mode of the aforementioned CoMP transmission method. For instance, referring to Table 4, if a user equipment performs a blind decoding on PDCCH masked with C-RNTI and then detects a DCI format 2D, the user equipment decodes PDSCH in an assumption that the PDSCH has been transmitted with a multi-layer transmission scheme based on antenna port 7 to 14, i.e., DM-RS. Or, the user equipment decodes PDSCH in an assumption that the PDSCH has been transmitted with a single antenna transmission scheme based on DM-RS antenna port 7 or 8.

On the contrary, if the user equipment performs blind decoding on PDCCH masked with C-RNTI and then detects a DCI format 1A, a transmission mode varies according to whether a corresponding subframe corresponds to an MBSFN subframe. For instance, if the corresponding subframe corresponds to a non-MBSFN subframe, the user equipment decodes PDSCH in an assumption that the PDSCH has been transmitted with a single antenna transmission scheme based on a CRS of an antenna port 0 or a CRS-based transmit diversity scheme. And, if the corresponding subframe corresponds to an MBSFN subframe, the user equipment decodes the PDSCH in an assumption that the PDSCH has been transmitted with a single antenna transmission based on a DM-RS of an antenna port 7.

The present invention proposes a method for efficiently managing a primary component carrier, primary cell or PCell or a secondary component carrier, secondary cell or SCell while a UE performs a carrier aggregation operation. Hereinafter, although a UE operates using an aggregate of two component carriers, three or more component carriers may be aggregated.

Figure 11:
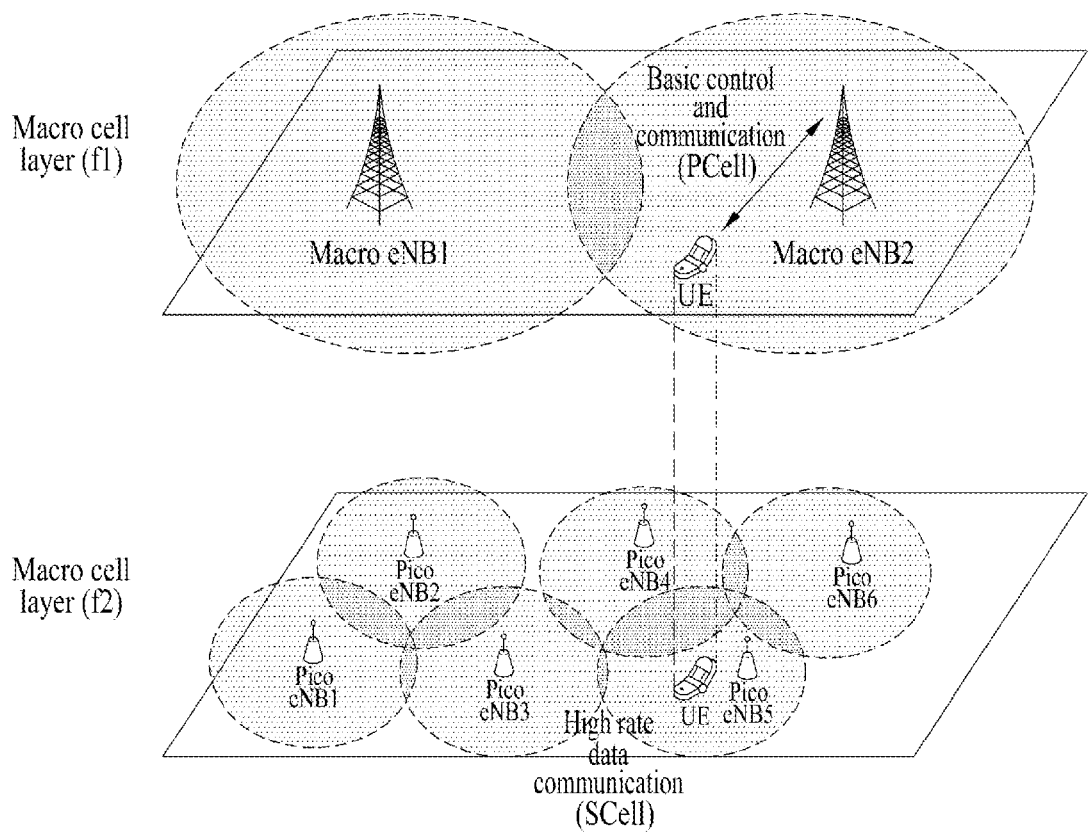
FIG. 11 is a diagram showing the configuration of a network configured via two component carriers.

FIG. 11 is a diagram showing the configuration of a network configured via two component carriers.

Referring to FIG. 11, it can be seen that a macro cell layer composed of a small number of macro cells each having wide coverage is configured using one carrier frequency f1. The carrier frequency f1 is located in a relatively low frequency band having low propagation attenuation to provide a basic communication service of a UE over a wider area and to perform a mobility management operation. Accordingly, the frequency is preferably set as a PCell.

Next, a micro cell layer composed of a plurality of micro cells each having small coverage is configured using another carrier frequency f2. The carrier frequency f2 is located in a relatively high frequency band such that wide bandwidth is easily occupied even when propagation attenuation is high and provides a high-quality communication service to a specific area. Accordingly, the frequency is preferably set as an SCell.

Meanwhile, when a UE operates a communication device in a specific frequency band, a battery of the UE is consumed. Accordingly, similar to FIG. 11, in the case of a UE using two frequency bands, if data does not need to be transmitted via the two frequency bands due to low traffic, communication via one of the two frequencies is preferably stopped in order to reduce battery power consumption. In the example of FIG. 11, since basic communication is performed at the macro cell layer set as the PCell, a communication device corresponding to the micro cell layer set as the SCell is turned off, thereby reducing battery power consumption when traffic is low.

However, in order to rapidly start communication at the micro cell layer when traffic occurs, a basic measurement operation of the layer should be performed. More specifically, a network should check to which pico eNB the UE is closest at the micro cell layer, in order to rapidly perform data transmission via the closest pico eNB if high traffic occurs. Such basic measurement may be performed via radio resource management (RRM) measurement for the frequency. RRM measurement includes measurement reference signal received power (RSRP) or reference signal received quality (RSRQ). The UE stops the operation of a receiver for the carrier frequency f2 during a long time to reduce battery power consumption, but intermittently operates the receiver to perform RRM measurement at the carrier frequency f2 and periodically or aperiodically reports the result to the network.

In general, when the network aggregates a plurality of carriers with respect to the UE, one serving cell is configured in one frequency band. In FIG. 11, the network configures macro eNB2 as a PCell which is a serving cell of the frequency f1 and configures pico eNB5 as an SCell which is a serving cell of the frequency f2. At this time, if the traffic of the UE is low, the network instructs the SCell to be deactivated in order to reduce battery power consumption of the receiver for the frequency f2.

Even when the SCell is deactivated, the UE performs RRM measurement for the frequency f2 according to a given rule in order to perform basic measurement in the frequency band. In this state, when the traffic of the UE increases, the network may activate the SCell and transmit and receive data via pico eNB5.

For reference, in an LTE system, UE operation related to activation/deactivation of the SCell is defined as follows. When an activation command of the SCell is received on subframe #n, the activation operation is performed on subframe #(n+8). In addition, when a deactivation command of the SCell is received on subframe #n or a deactivation timer of the SCell is expired on subframe #n, the deactivation operation is performed on subframe #(n+8) except that operation related to channel state reporting is performed on subframe #(n+8).

Accordingly, as described above, since activation/deactivation of the SCell is controlled by a command included in a medium access control (MAC) control element (CE), activation/deactivation may be completed within a relatively short time of 8 ms. Accordingly, time delay occurring due to activation/deactivation operation performed based on traffic may be regarded as being low. Here, 8 ms may be a unit of eight subframes.

In contrast, when the UE moves in the state shown in FIG. 11, an optimal eNB is changed and, more particularly, an optimal eNB is more frequently changed in a micro cell layer in which eNBs each having small coverage are densely arranged. If an existing carrier aggregation operation is maintained, the SCell should be frequently changed in order to maintain an optimal eNB at the micro cell layer according to movement of the UE. This is possible via reconfiguration of carrier aggregation and, as a result, RRC reconfiguration is necessary.

In general, RRC reconfiguration involves a confirmation process for safer reestablishment and, as a result, causes time delay of several tens or more of ms. Accordingly, if the operation of FIG. 11 is performed while maintaining the existing carrier aggregation operation, the network should frequently reconfigure the SCell and time delay and signaling overhead increase due to RRC reconfiguration.

The present invention proposes an operation method for starting rapid data transmission and reception in an SCell with low signaling overhead and low time delay. More specifically, the network configures a plurality of SCells in the frequency band f2 corresponding to the micro cell layer and appropriately activates one of the plurality of SCells.

This means that, in a state that the network configures a plurality of SCell candidates in the same frequency band in advance, only one optimal SCell is activated and the remaining SCells are deactivated according to the measurement result of the band. Such a method has an advantage such as low time delay of the MAC CE because an optimal SCell is selected via SCell activation/deactivation using the MAC CE instead of RRC reconfiguration.

Figure 12:
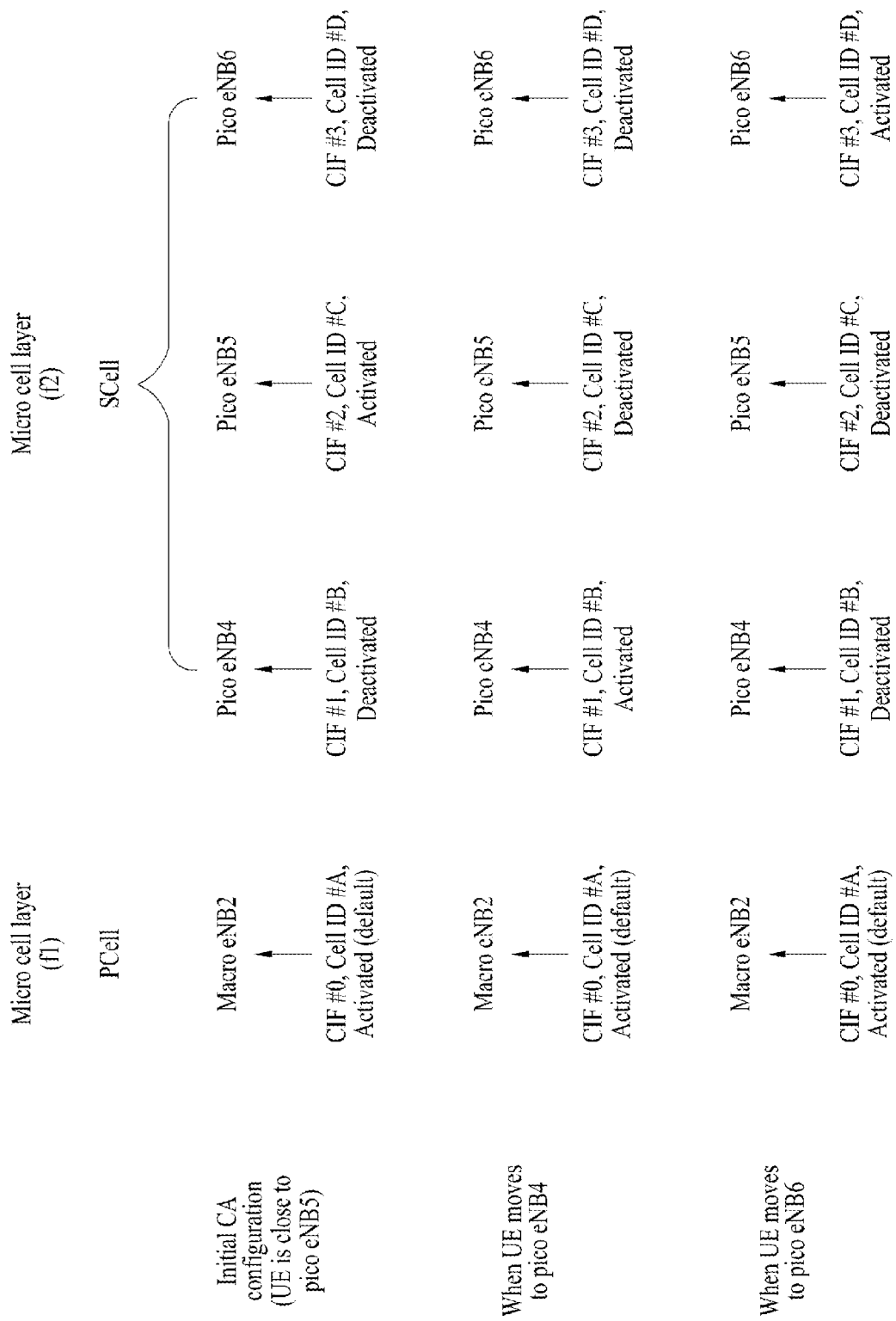
FIG. 12 is a diagram showing an example of performing an SCell activation/deactivation operation according to an embodiment of the present invention.

FIG. 12 is a diagram showing an example of performing an SCell activation/deactivation operation according to an embodiment of the present invention.

Referring to FIG. 12, pico eNB5 is activated in an initial carrier aggregation configuration, but an SCell activated every time is changed according to movement of the UE and only one SCell is always activated on a single component carrier.

More specifically, in FIG. 12, when the UE moves to pico eNB4, pico eNB5 is deactivated and pico eNB4 is activated. In addition, when the UE moves to pico eNB6, the activated pico eNB4 is deactivated and pico eNB6 is activated.

For such operation, in the present invention, first, when the network performs the initial carrier aggregation configuration, a series of SCells may be grouped into one group and the UE may be pre-informed of a constraint condition that a plurality of SCells belonging to the same group is not simultaneously activated. Of course, the network may send a list of the SCells belonging to one group to the UE via higher layer signaling such as RRC signaling. Based on this, since the UE can know that only one SCell is activated even when a plurality of SCells is configured on the same component carrier, it is possible to prevent an unnecessary process of performing an operation on the assumption that two or more SCells are simultaneously activated. Otherwise, a UE which cannot operate a plurality of SCells on one component carrier can configure a plurality of SCells. In this case, the UE may assume that two or more SCells are not simultaneously activated or determine that network configuration errors occur when two or more SCells are simultaneously activated.

Since a plurality of SCells is configured on one component carrier, a measurement report criterion of SCells and neighboring cells may be changed. A UE, which currently aggregates a plurality of carriers, performs measurement with respect to a component carrier, on which an SCell is present, determines that a better (neighboring) cell than an SCell, which is a serving cell, is present if the measured RSRP/RSRQ value of the neighboring cell is greater than that of the configured SCell or is greater than a value obtained by adding a predetermined weight to the measured value of the configured SCell, and reports the better cell to the network.

According to the proposal of the present invention, a plurality of SCells is present on one component carrier and, at this time, overhead may occur when measurement of the neighboring cell is compared with measurement of several SCells and is reported. In order to reduce such overhead, in the present invention, if a plurality of SCells is configured on one component carrier, only one representative measurement value is set as a value representing the plurality of SCells and is compared with measurement of the neighboring cell. The representative measurement value may be measurement of a predetermined SCell (e.g., an SCell having a smallest index) or a maximum/minimum/average measurement value of the SCells.

Figure 13:
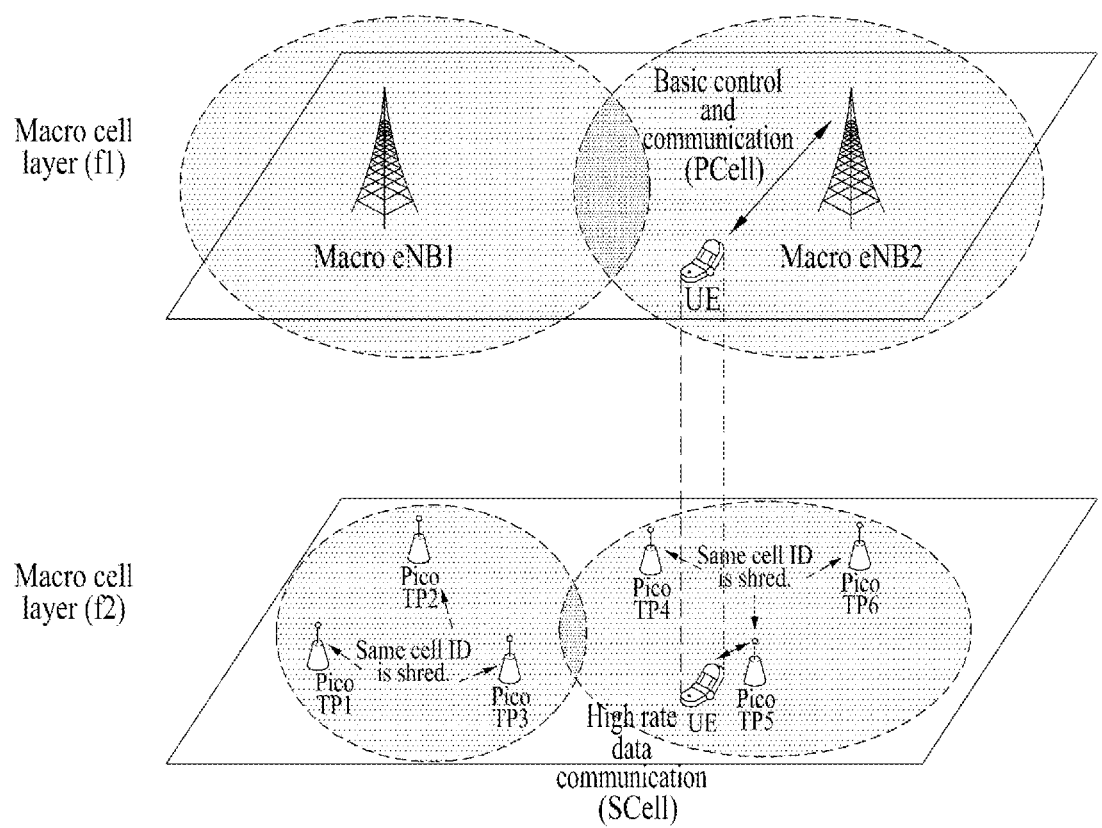
FIG. 13 is a diagram showing the configuration of another network configured via two component carriers.

Additionally, FIG. 13 may be considered to have network deployment similar to FIG. 11. FIG. 13 is a diagram showing the configuration of another network configured via two component carriers.

FIG. 13 is different from FIG. 11 in that a plurality of pico transmission points (TPs) shares the same cell ID to become some antennas of one cell. In this case, since the plurality of pico TPs can be managed by configuring only one SCell on one component carrier, measurement is simplified.

However, in this case, similarly, an optimal pico TP is changed according to movement of a UE. Thus, which pico TP is activated is further designated via an activation command. Since each pico TP may have a separate control channel/data channel configuration, the network may set a plurality of control channel/data channel configurations with respect to one SCell in advance and further designate via which configuration the pico TP for transmitting the control channel/data channel is activated.

Figure 14:
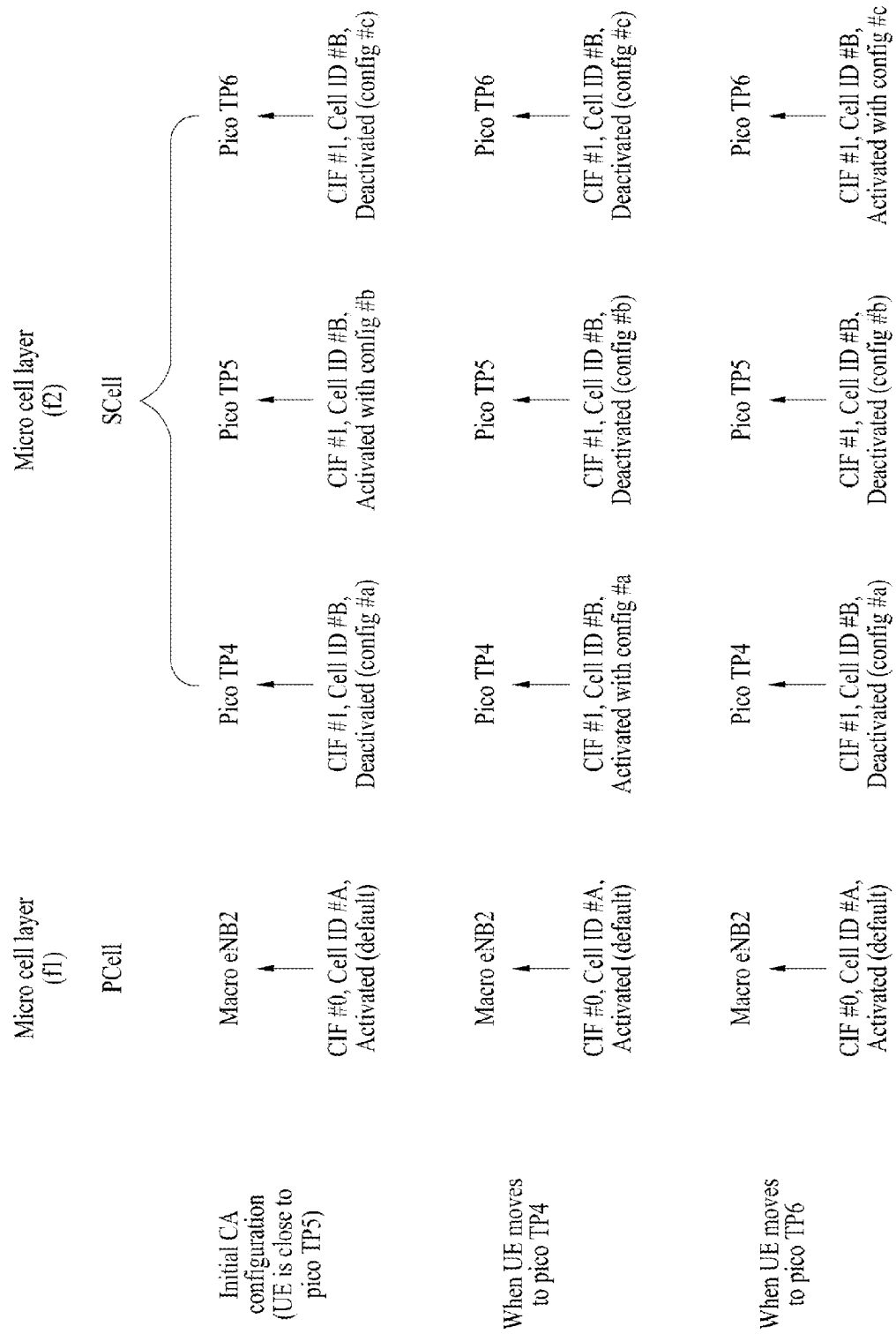
FIG. 14 is a diagram showing a method of activating an SCell composed of a plurality of transmission points (TPs) according to an embodiment of the present invention.

FIG. 14 is a diagram showing a method of activating an SCell composed of a plurality of transmission points (TPs) according to an embodiment of the present invention. In particular, in FIG. 14, assume that one SCell composed of pico TP4, pico TP5 and pico TP6 is configured.

Referring to FIG. 14, when the SCell is activated, the eNB may further indicate an index of a control channel/data channel configuration to be used. Here, since the three pico TPs have the same cell ID, the same carrier indicator field (CIF) is designated. However, the eNB may designate the control channel/data channel configurations used by the pico TPs as indices such as configuration #a, configuration #b and configuration #c and further designate via which configuration the pico TP for transmitting the control channel/data channel is activated via an activation command.

SCells having the same cell identifier are configured, that is, a plurality of CIFs is assigned to one cell identifier, but the control channel/data channel configurations applied to the SCells may be differently set.

Figure 15:
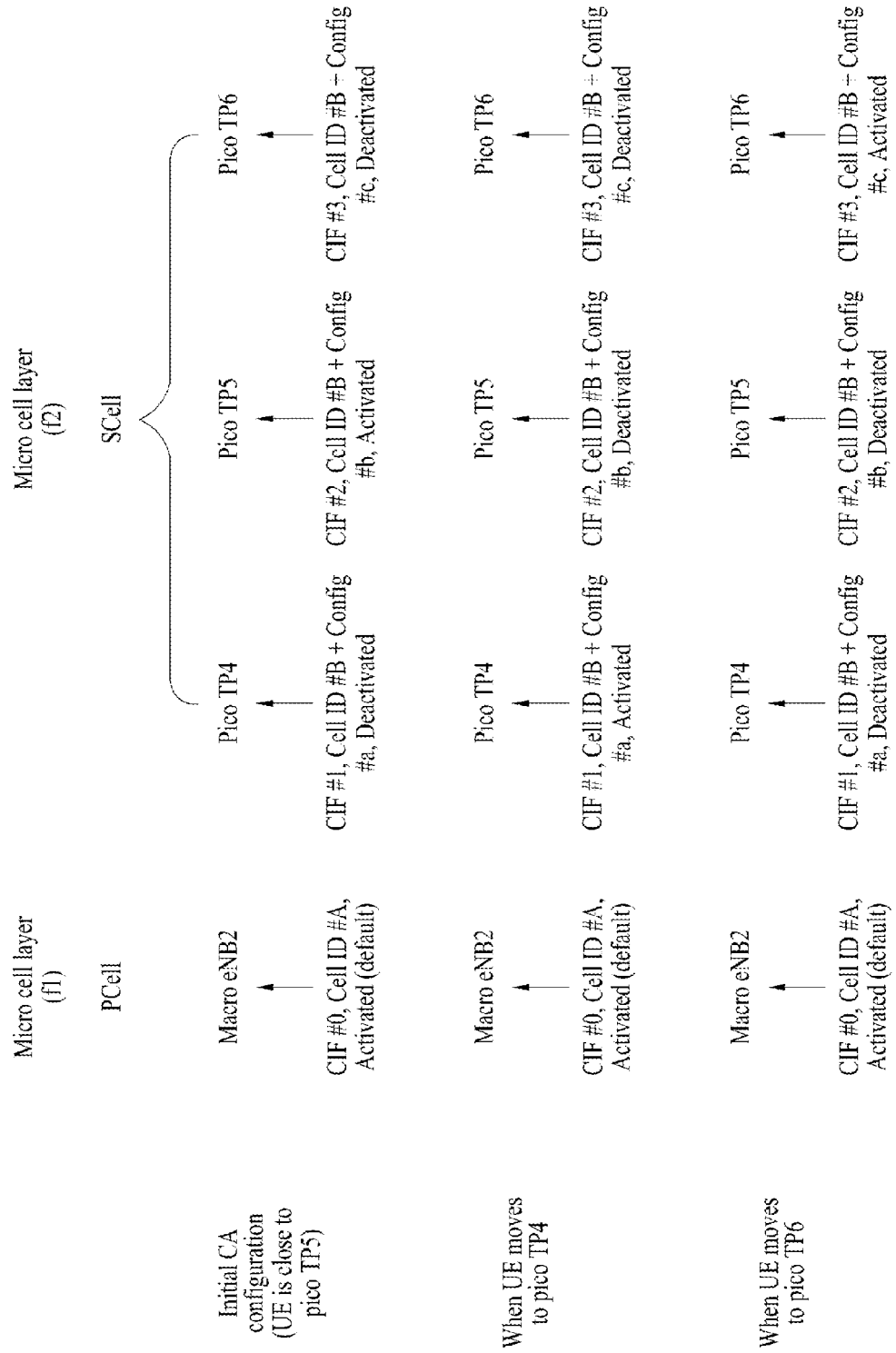
FIG. 15 is a diagram showing a method of activating an SCell if SCells having the same cell identifier are configured according to an embodiment of the present invention.

FIG. 15 is a diagram showing a method of activating an SCell if SCells having the same cell identifier are configured according to an embodiment of the present invention.

Referring to FIG. 15, cell identifiers shared by pico TP4, pico TP5 and pico TP6 are designated with respect to CIF #1, CIF #2 and CIF #3 and the control channel/data channel configurations used by the respective CIFs are differently set. Accordingly, via which configuration the pico TP for transmitting the control channel/data channel is activated may be further designated via the activation command (or the CIF).

The above-described control channel/data channel configuration may include the following information.

First, as a control channel configuration and, more particularly, an EPDCCH configuration, 1) a set of RBs in which a search space for the EPDCCH is configured, 2) a transmission method of the EPDCCH, e.g., whether single downlink control information (DCI) is distributed EPDCCH transmission on a plurality of PRB pairs or localized EPDCCH transmission on one PRB pair, 3) a configuration of a scrambling sequence generation seed used for a reference signal of the EPDCCH, e.g., a DM-RS, 4) information about resources to which the EPDCCH is mapped, that is, an index of an OFDM symbol, on which the EPDCCH starts to be transmitted or a method of determining the index, or information about an RE on which a CRS or CSI-RS unavailable as the EPDCCH is located, and 5) information about quasi co-location (QCL) of a DM-RS antenna port for the EPDCCH may be included. Additionally, 6) information indicating which of an EPDCCH or a PDCCH is detected from each subframe may be further included.

Among the above-described configuration information, QCL means that all or some of large-scale properties of a signal received by a UE from one antenna port (or a radio channel corresponding to the antenna port) are equal to large-scale properties of a signal from another antenna port (or a radio channel corresponding to the antenna port). Here, the large-scale properties may include Doppler spread related to a frequency offset, Doppler shift, average delay related to a timing offset, delay spread, etc. and may further include average gain.

Next, as a data channel configuration and, more particularly, a PDSCH configuration, a) a transmission mode, b) resources to be subjected to CSI measurement, that is, a CSI-RS resource configuration and an interference measurement resource configuration, c) a configuration of a scrambling sequence generation seed of a reference signal for a PDSCH, a PUSCH and/or a PUCCH, d) information about resources to which the PDSCH is mapped, that is, an index of an OFDM symbol, on which the PDSCH starts to be transmitted or a method of determining the index, or information about an RE on which a CRS or CSI-RS unavailable as the PDSCH is located, and e) information about quasi co-location (QCL) of a reference signal to be used for channel estimation of the PDSCH may be included. Additionally, f) information about a PUSCH region used to transmit HARQ-ACK for the PDSCH may be further included.

Additionally, the control channel/data channel configuration may also include information about a detailed resource configuration. More specifically, each TP or each eNB may dynamically configure use of available resources. Every time of available resources means each subframe, and use of available resources may be configured by indicating whether each subframe is configured as a downlink subframe used when an eNB transmits a signal to a UE or an uplink subframe used when a UE transmits a signal to an eNB.

In the case of an FDD system, based on the amount of downlink traffic and uplink traffic to be processed by a specific TP, a specific subframe of a downlink band or an uplink band used by the TP may be set as an uplink subframe or a downlink subframe.

Even in the case of a TDD system, similarly, differently from an uplink/downlink subframe configuration statically designated via an SIB, an optimal uplink/downlink subframe configuration to be used at a specific time may be separately designated. In this case, a resource configuration corresponds to information indicating the configuration of downlink and uplink subframes actually used at that time and may be different from a configuration statically designated via system information. In the case of the FDD system, a configuration designated via system information may be regarded as a configuration in which all subframes of a downlink band and an uplink band are respectively downlink subframes and uplink subframes.

As described above, if the resource configuration is dynamically changed, a HARQ timeline, that is, a point of time when a scheduling message for a PDSCH and a PUSCH and HARQ-ACK or a PHICH transmitted on each subframe are transmitted, is inaccurately defined at a boundary of a point where the resource configuration is changed. This is because the HARQ timeline is defined by a currently used resource configuration.

In order to prevent this problem, the network may notify the UE of the HARQ timeline enabling proper operation even when the resource configuration is dynamically changed, via higher layer signaling such as RRC signaling. In particular, in the case of the TDD system, a specific uplink/downlink subframe configuration may be designated via signaling of the HARQ timeline and an operation may be performed based on the HARQ timeline defined in the configuration. Of course, the uplink/downlink subframe configuration used as a criterion of the HARQ timeline may be different from an uplink/downlink subframe configuration designated in system information or an uplink/downlink subframe configuration designated for a resource configuration. In addition, a HARQ timeline for a PDSCH and a HARQ timeline for a PUSCH may also be defined based on different reference uplink/downlink subframe configurations. If the HARQ timeline for dynamic resource change is designated, a HARQ timeline configuration may also be transmitted along with resource configuration information.

Figure 16:
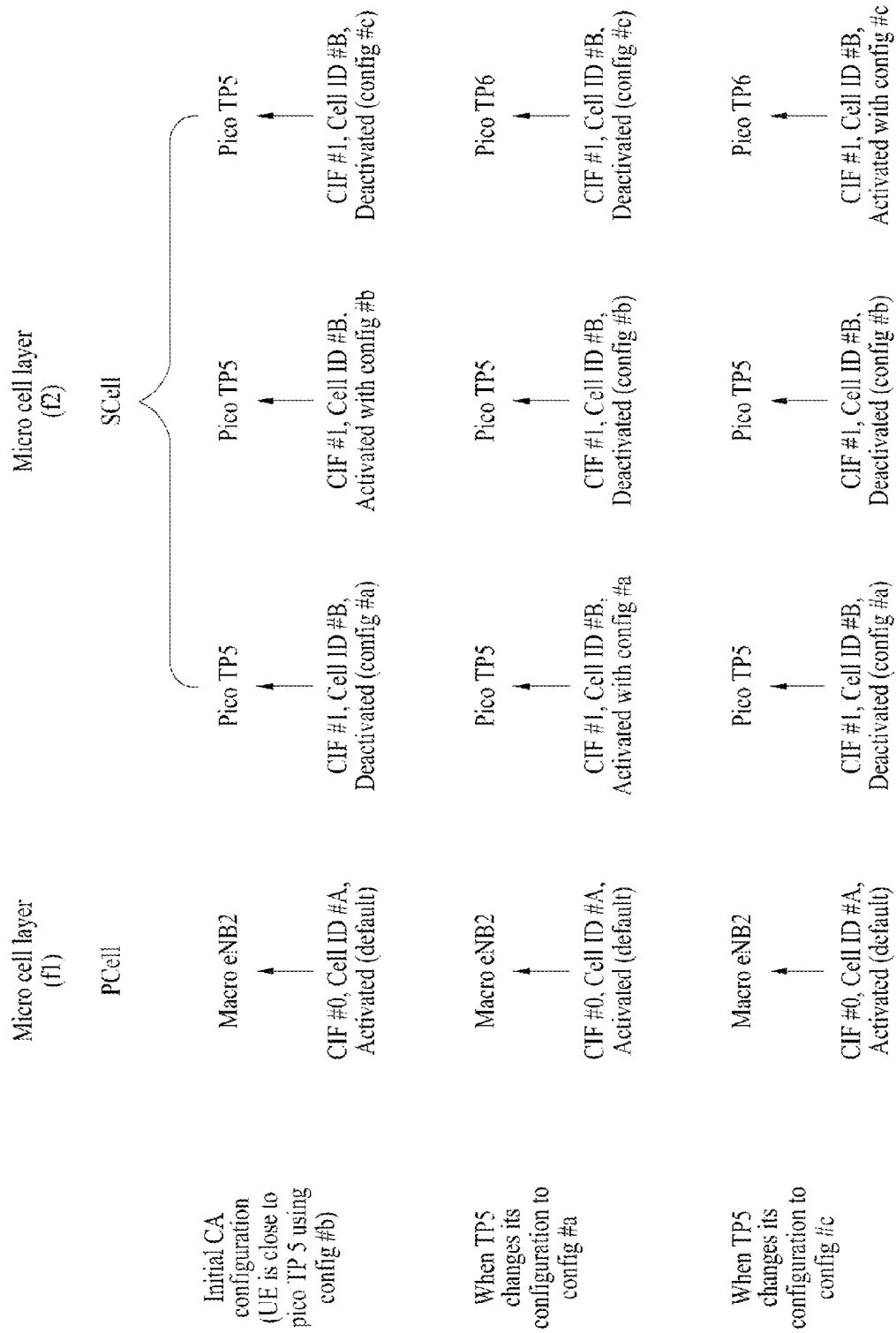
FIG. 16 is a diagram showing an example of dynamically changing a configuration at a TP when a signal is received using one TP on one component carrier according to an embodiment of the present invention.

The embodiment of the present invention may be used when only one TP is used on one component carrier and the TP dynamically changes a configuration. FIG. 16 is a diagram showing an example of dynamically changing a configuration at a TP when a signal is received using one TP on one component carrier according to an embodiment of the present invention.

Referring to FIG. 16, the UE operates using TP5 only at a micro cell layer and an activated state is changed by changing a configuration used by pico TP5 at every time. As shown in FIG. 15, this is applicable to the case in which different configurations are linked to different CIF values to be activated/deactivated.

Additionally, the embodiment of the present invention may be used even when carrier aggregation is not applied. For example, the operation of the SCell of the embodiment described with reference to FIG. 16 is applicable to a UE which operates by configuring pico TP5 as a PCell at a micro cell layer without carrier aggregation.

Figure 17:
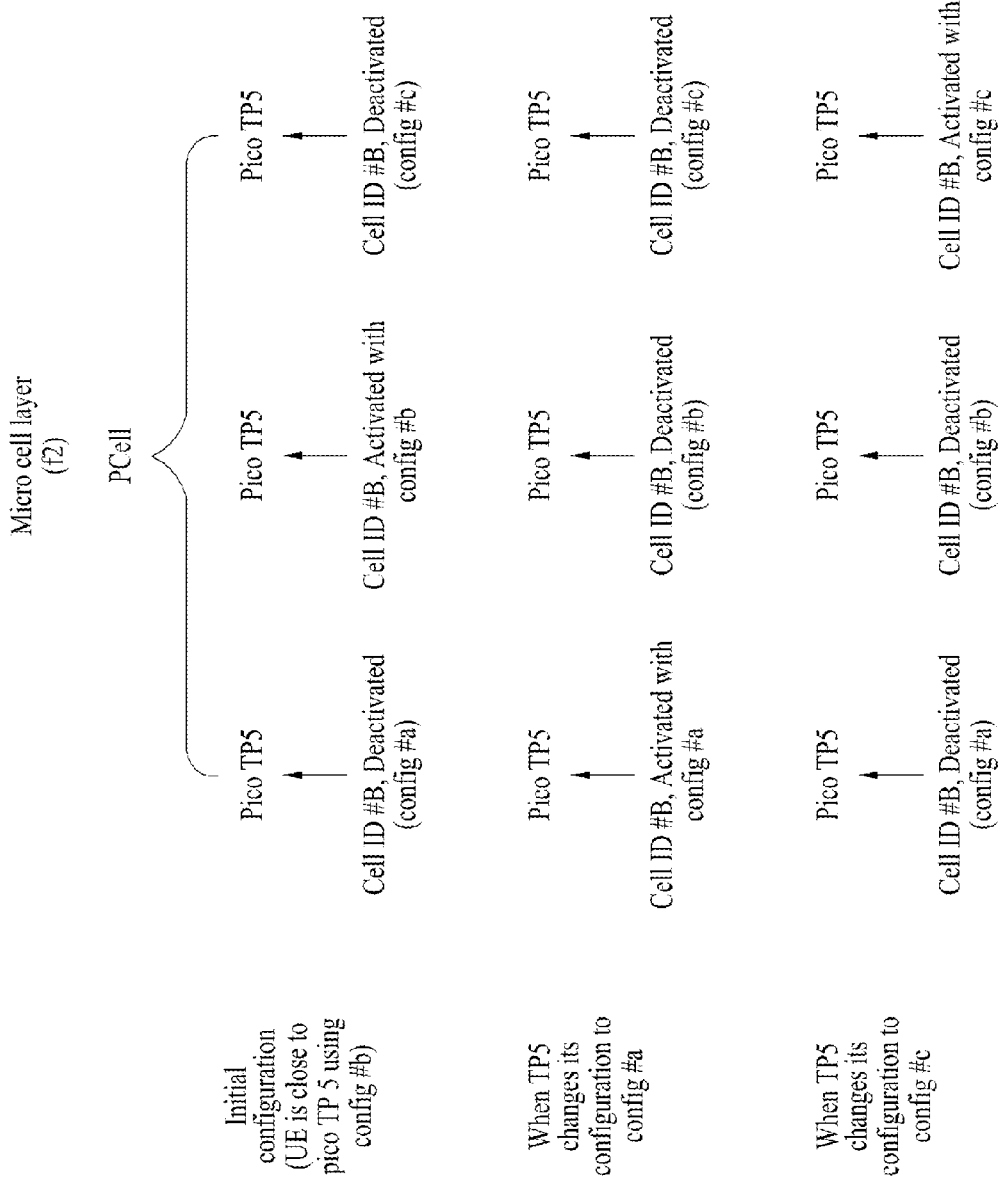
FIGS. 17 and 18 are diagrams showing an embodiment of the present invention when a carrier aggregation scheme is not applied.
Figure 18:
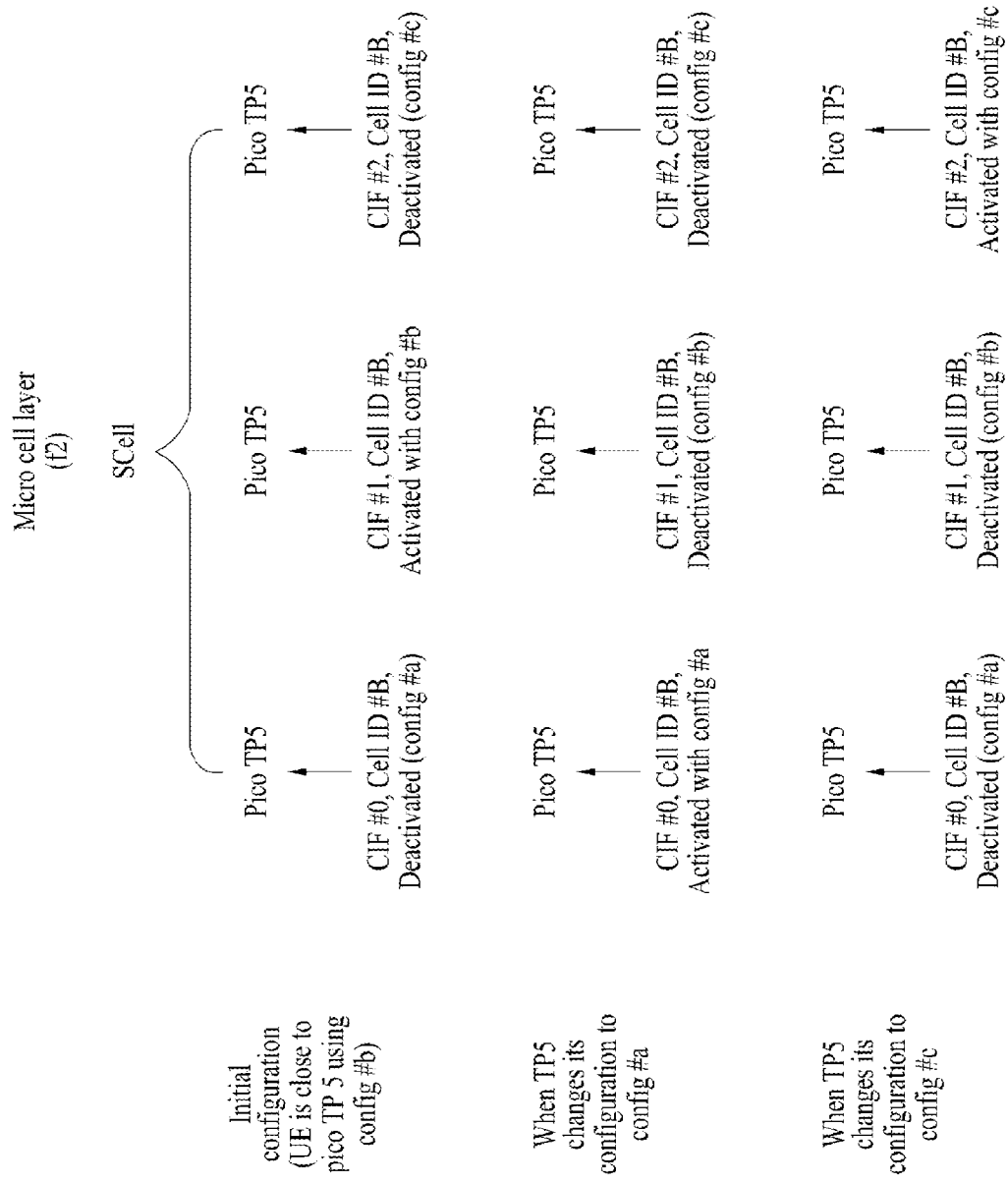

FIGS. 17 and 18 are diagrams showing an embodiment of the present invention when a carrier aggregation scheme is not applied.

If activation/deactivation states are not distinguished using a CIF, as shown in FIG. 17, the CIF may be omitted. Alternatively, if activation/deactivation states, that is, control channel/data channel configurations, are distinguished by different CIFs even when carrier aggregation is not configured, as shown in FIG. 18, the CIF may be used to indicate change in configuration on the same component carrier.

As described above, even when a carrier aggregation scheme is applied and measurement of a plurality of component carriers is performed, measurement of frequency bands other than a frequency band for performing data transmission and reception should be performed to determine whether a cell having better quality is present in another frequency band. This is referred to as inter-frequency measurement.

In such inter-frequency measurement, since the UE should move a receiver used to receive data to another band to perform measurement, data reception is temporarily restricted. The network configures a measurement gap and enables the UE to move the receiver to another band during the measurement gap to perform inter-frequency measurement.

According to the embodiment of the present invention, even when the UE performs inter-frequency measurement, some of a plurality of receivers may be used for inter-frequency measurement and data may be continuously received on component carriers using the remaining receivers. That is, inter-frequency measurement may be configured to be performed on some component carriers to enable continuous data communication to the UE.

For this, in the present invention, which component carrier requires the measurement gap when a UE aggregates specific component carriers is indicated.

More specifically, the UE may notify the network in which frequency band the measurement gap is configured in order to perform inter-frequency measurement when inter-frequency measurement for a specific frequency band is performed in a state in which a plurality of carriers is aggregated by a combination of specific frequency bands.

For example, if the UE performs inter-frequency measurement with respect to band #3 when band #1 and band #2 are aggregated, whether band #1 and/or band #2 require the gap may be signaled. The form of such signaling may be {(a combination of bands aggregated by the UE), a band to be subjected to inter-frequency measurement, necessity of a measurement gap, (a combination of bands requiring a measurement gap)}.

For example, when band #1 and band #2 are aggregated, if a UE which performs inter-frequency measurement with respect to band #3 requires a gap at band #1, such signaling may be defined in the form of {(band #1, band #2), band #3, necessity, (band #1)}.

FIG. 19 is a diagram showing the structure of a receiver of a user equipment (UE) supporting carrier aggregation according to one embodiment.

Referring to FIG. 19, necessity of the measurement gap may be reported to the network using various forms according to bands in which a gap is configured. For example, if the UE performs inter-frequency measurement with respect to band #3 when band #1 and band #2 are aggregated, the network may be informed that inter-frequency measurement is performed with respect to band #3 when the gap is configured at band #1 and the network may be informed that inter-frequency measurement is performed with respect to band #3 when the gap is configured at band #3.

As shown in FIG. 19(*a*), this means that two receivers for receiving band #1 and band #2 may be switched to band #3 to perform inter-frequency measurement. At this time, the UE may indicate signaling in the form of {(band #1, band #2), band #3, necessity, (band #1)} and {band #1, band #2}, band #3, necessity, (band #2 )}. The eNB, which has received such information, configures a measurement gap in one of band #1 and band #2 to perform inter-frequency measurement at band #3.

In contrast, as shown in FIG. 19(*b*), if the receiver of band #2 may not be switched to band #3, since only band #1 is valid as a measurement gap configuration, only {(band #1, band #2), band #3, necessity, (band #1)} is reported as signaling.

As another example of a signaling form, the UE may inform the network of configuration structure information of a radio frequency circuit implemented by the UE or a circuit used for measurement. The structure for configuring the measurement circuit includes information about which band and/or which combination of bands may be measured by each measurement circuit of the UE.

Referring to FIG. 19, as configuration information of measurement circuit #1, measurement information may be defined and reported as {band 1, band 3} in FIGS. 19(*a*) and 19(*b*). Here, a list of bands indicates bands which may be measured at measurement circuit #1. In contrast, as configuration information of measurement circuit #2, measurement information may be defined and reported as {band 2, band 3} in FIG. 19(*a*) but measurement information may be defined and reported as {band 2} in FIG. 19(*b*). Similarly, a list of bands indicates bands which may be measured at measurement circuit #2.

Preferably, the UE may use a general procedure of reporting capability information of the UE in order to inform the network of the above-described information.

Additionally, the network may explicitly indicate a component carrier, to which the measurement gap is applied, when configuring the measurement gap with respect to the UE which performs carrier aggregation. Alternatively, the network signals a component carrier, to which the measurement gap is not applied, to the UE, when configuring the measurement gap. Alternatively, the network may inform the UE of which measurement circuit of the UE is used to perform band measurement before requesting measurement of a specific band from the UE based on measurement related circuit configuration combination information received from the UE.

The UE performs communication, that is, continuous signal reception, via a component carrier, to which the measurement gap is not applied, while applying the measurement gap to perform measurement. Alternatively, the network may instruct the UE to continuously receive the signal via the component carrier, to which the measurement gap is not applied.

Figure 20:
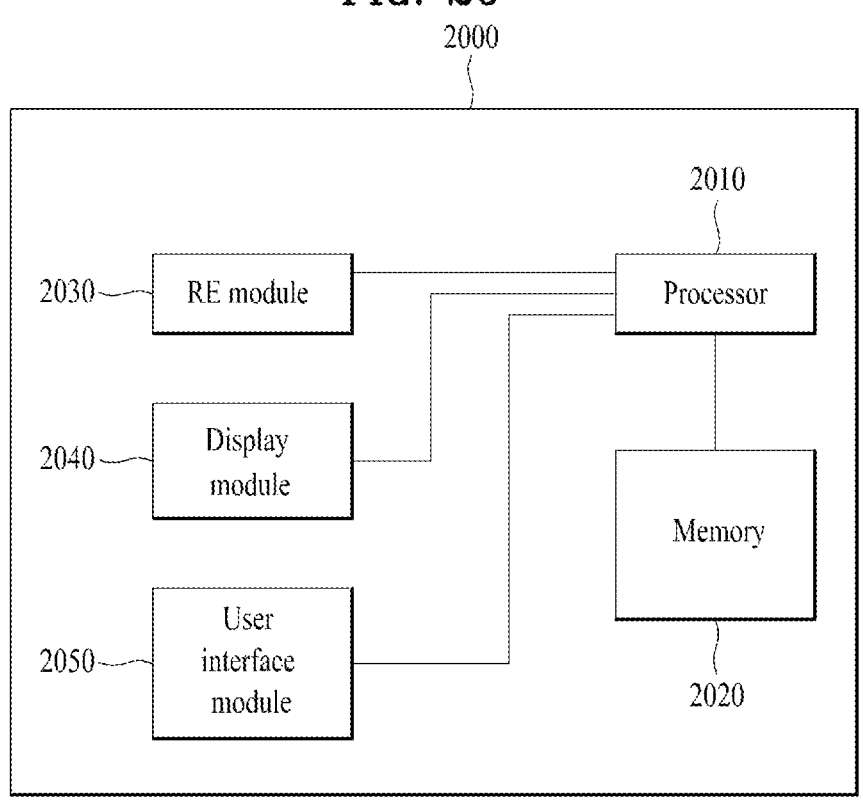
FIG. 20 is a block diagram for an example of a communication device according to one embodiment of the present invention.

FIG. 20 is a block diagram for an example of a communication device according to one embodiment of the present invention.

Referring to FIG. 20, a communication device 2000 may include a processor 2010, a memory 2020, an RF module 2030, a display module 2040, and a user interface module 2050.

Since the communication device 2000 is depicted for clarity of description, prescribed module(s) may be omitted in part. The communication device 2000 may further include necessary module(s). And, a prescribed module of the communication device 2000 may be divided into subdivided modules. A processor 2010 is configured to perform an operation according to the embodiments of the present invention illustrated with reference to drawings. In particular, the detailed operation of the processor 2010 may refer to the former contents described with reference to FIG. 1 to FIG. 19.

The memory 2020 is connected with the processor 2010 and stores an operating system, applications, program codes, data, and the like. The RF module 2030 is connected with the processor 2010 and then performs a function of converting a baseband signal to a radio signal or a function of converting a radio signal to a baseband signal. To this end, the RF module 2030 performs an analog conversion, amplification, a filtering, and a frequency up conversion, or performs processes inverse to the former processes. The display module 2040 is connected with the processor 2010 and displays various kinds of informations. And, the display module 2040 can be implemented using such a well-known component as an LCD (liquid crystal display), an LED (light emitting diode), an OLED (organic light emitting diode) display and the like, by which the present invention may be non-limited. The user interface module 2050 is connected with the processor 2010 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although an example in which a method and apparatus for operating a serving cell in a wireless communication system, to which a carrier aggregation scheme is applied, is applied to a 3GPP LTE system has been described, the present invention is applicable to various wireless communication systems in addition to the 3GPP LTE system.

The invention claimed is:

1. A method for operating a serving cell at a user equipment (UE) in a wireless communication system, the method comprising:
    receiving group information indicating at least one secondary cell (SCell) group via a higher layer signaling, wherein each of the at least one SCell group includes a plurality of SCells corresponding to a same frequency band;
    configuring an activated first SCell of a first SCell group among the at least one SCell group as the serving cell of the UE;
    receiving a serving cell configuration message from a network to deactivate the first SCell and activate a second SCell of the first SCell group, wherein the serving cell configuration message is included in a medium access control (MAC) control element (CE); and
    configuring the activated second SCell as the serving cell of the UE,
    wherein two or more SCells in a same SCell group of the at east one SCell group are not allowed to be activated simultaneously.

2. The method according to claim 1, further comprising:
    configuring one primary cell (PCell), which is always activated, as the serving cell to transmit and receive signals, respectively, to and from the network.

3. The method according to claim 1, wherein:
    the plurality of SCells in each of the at least one SCell group are identified by different carrier indicator field values, and the serving cell configuration message includes information about one of the different carrier indicator field values.

4. The method according to claim 1, wherein:
the plurality of SCells in each of the at least one SCell group are identified by a same cell identifier and a same carrier indicator field value, and
the serving cell configuration message includes configuration information of signals transmitted to, and received from, the second SCell.

5. The method according to claim 4, wherein configuration information of signals transmitted to, and received from, the plurality of SCells is different.

6. The method according to claim 2, wherein each of the at least one SCell group has a higher frequency band than the PCell.

7. The method according to claim 2, wherein coverage of the at least one SCell group is included in coverage of the PCell.

8. A user equipment (UE) in a wireless communication system, the UE comprising:
a transceiver configured to transmit and receive a signals, respectively, to and from a network; and
a processor configured to control the transceiver and to process the signals,
wherein the processor is further configured to:
receive, via the transceiver, group information indicating at least one secondary cell (SCell) group via a higher layer signaling, wherein each of the at least one SCell group includes a plurality of SCells corresponding to a same frequency band,
configure an activated first SCell of a first SCell group among the at least one SCell group as a serving cell of the UE,
receive, via the transceiver, a serving cell configuration message from the network to deactivate the first SCell and activate a second SCell of the first SCell group,
wherein the serving cell configuration message is included in a medium access control (MAC) control element (CE), and
configure the activated second SCell as the serving cell of the UE, and
wherein two or more SCells in a same SCell group of the at least one SCell group are not allowed to be activated simultaneously.

9. The UE according to claim 8, wherein the processor is further configured to configure one primary cell (PCell), which is always activated, as the serving cell to transmit and receive the signals, respectively, to and from the network.

10. The UE according to claim 8, wherein:
the plurality of SCells in each of the at least one SCell group are identified by different carrier indicator field values, and
the serving cell configuration message includes information about one of the different carrier indicator field values.

11. The UE according to claim 8, wherein:
the plurality of SCells in each of the at least one SCell group are identified by a same cell identifier and a same carrier indicator field value, and
the serving cell configuration message includes configuration information of signals transmitted to, and received from, the second SCell.

12. The UE according to claim 11, wherein configuration information of signals transmitted to, and received from, the plurality of SCells is different.

13. The UE according to claim 9, wherein each of the at least one SCell group has a higher frequency band the PCell.

14. The UE according to claim 9, wherein coverage of the at least one SCell group is included in coverage of the PCell.

* * * * *